(12) United States Patent
Park et al.

(10) Patent No.: US 10,193,608 B2
(45) Date of Patent: Jan. 29, 2019

(54) METHOD FOR TRANSMITTING/RECEIVING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Hanbyul Seo, Seoul (KR); Kijun Kim, Seoul (KR); Joonkui Ahn, Seoul (KR); Byounghoon Kim, Seoul (KR); Seungmin Lee, Seoul (KR); Yunjung Yi, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/326,998

(22) PCT Filed: Jul. 15, 2015

(86) PCT No.: PCT/KR2015/007327
§ 371 (c)(1),
(2) Date: Jan. 17, 2017

(87) PCT Pub. No.: WO2016/010354
PCT Pub. Date: Jan. 21, 2016

(65) Prior Publication Data
US 2017/0201308 A1    Jul. 13, 2017

Related U.S. Application Data

(60) Provisional application No. 62/025,455, filed on Jul. 16, 2014.

(51) Int. Cl.
*H04B 7/06* (2006.01)
*H04W 16/14* (2009.01)
(Continued)

(52) U.S. Cl.
CPC ......... *H04B 7/0626* (2013.01); *H04B 7/0417* (2013.01); *H04B 17/24* (2015.01); *H04L 5/0053* (2013.01); *H04W 16/14* (2013.01)

(58) Field of Classification Search
None
See application file for complete search history.

(56) References Cited

U.S. PATENT DOCUMENTS

| 2012/0077510 A1* | 3/2012 | Chen | H04W 28/26 |
| | | | 455/452.1 |
| 2014/0029573 A1* | 1/2014 | Lee | H04W 36/08 |
| | | | 370/331 |

(Continued)

FOREIGN PATENT DOCUMENTS

| WO | 2012078565 | 6/2012 |
| WO | 2013086659 | 6/2013 |
| WO | 2013172674 | 11/2013 |

OTHER PUBLICATIONS

PCT International Application No. PCT/KR2015/007327, International Search Report dated Nov. 26, 2015, 2 pages.
(Continued)

*Primary Examiner* — Hong S Cho
(74) *Attorney, Agent, or Firm* — Lee, Hong, Degerman, Kang & Waimey

(57) ABSTRACT

Disclosed are a method for transmitting/receiving channel state information (CSI) in a wireless communication system and a device therefor. Specifically, a method for transmitting channel state information by a terminal in a wireless communication system may comprise the steps of: determining CSI for a serving cell in an unlicensed band; and transmitting the CSI at a periodic CSI report time point within a reserved resource period (RRP) which is a time period reserved for transmitting/receiving data in the serving cell.

14 Claims, 26 Drawing Sheets

(51) Int. Cl.
*H04L 5/00* (2006.01)
*H04B 17/24* (2015.01)
*H04B 7/0417* (2017.01)

(56) References Cited

U.S. PATENT DOCUMENTS

| | | | |
|---|---|---|---|
| 2014/0036881 A1* | 2/2014 | Kim | H04L 5/001 370/336 |
| 2014/0092878 A1* | 4/2014 | Davydov | H04W 4/70 370/336 |
| 2015/0131536 A1* | 5/2015 | Kaur | H04L 5/001 370/329 |
| 2015/0163805 A1* | 6/2015 | Cattoni | H04W 72/0453 370/329 |
| 2015/0365152 A1* | 12/2015 | Frenne | H04B 7/0626 370/252 |
| 2016/0007350 A1* | 1/2016 | Xiong | H04W 24/10 370/252 |

OTHER PUBLICATIONS

Fujitsu, "Way Forward on CSI reporting for CA," R1-111940, 3GPP TSG-RAN1#65, May 2011, 10 pages.

\* cited by examiner

【FIG. 1】
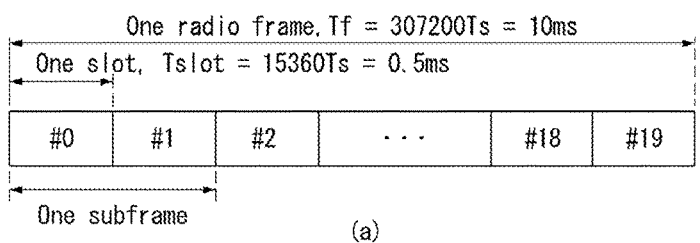
(a)
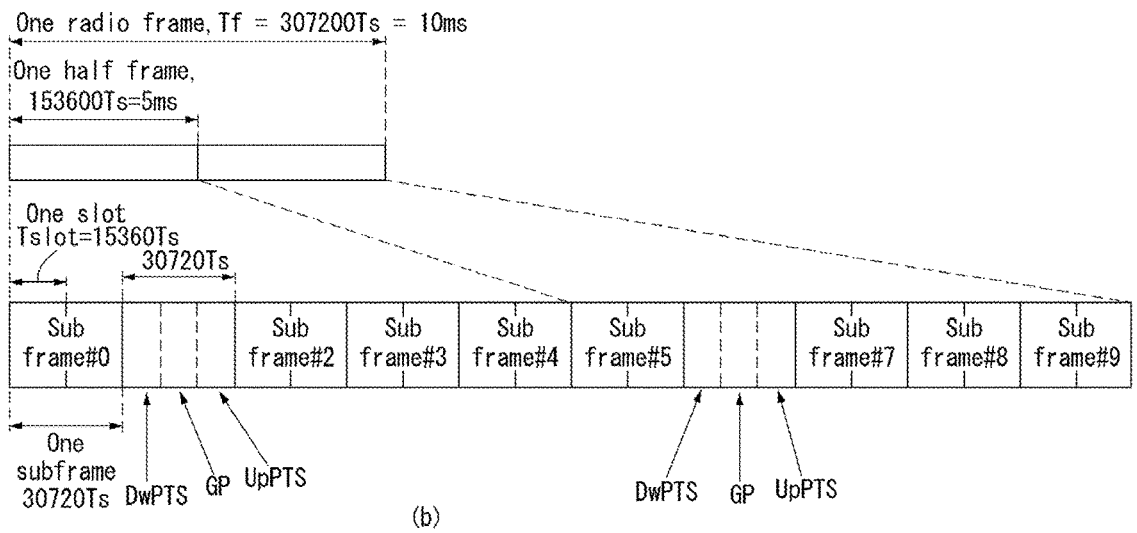
(b)

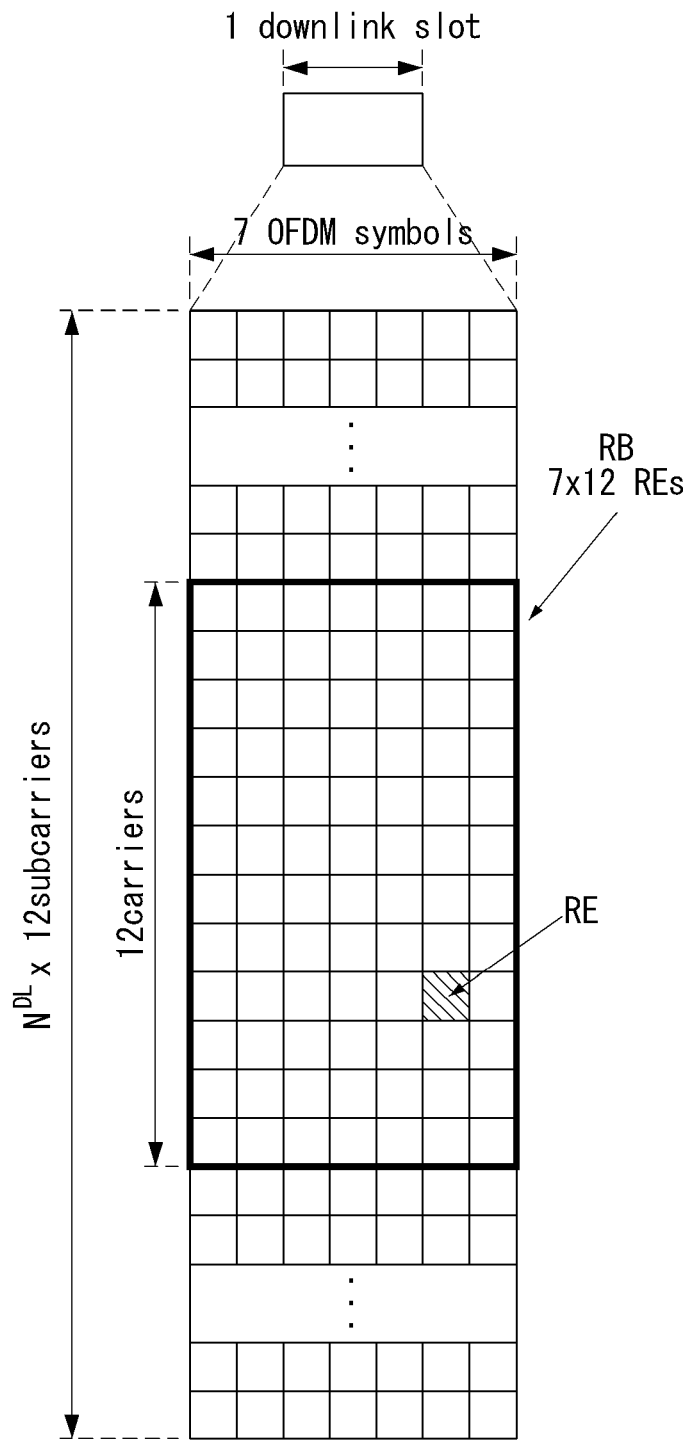
[FIG. 2]

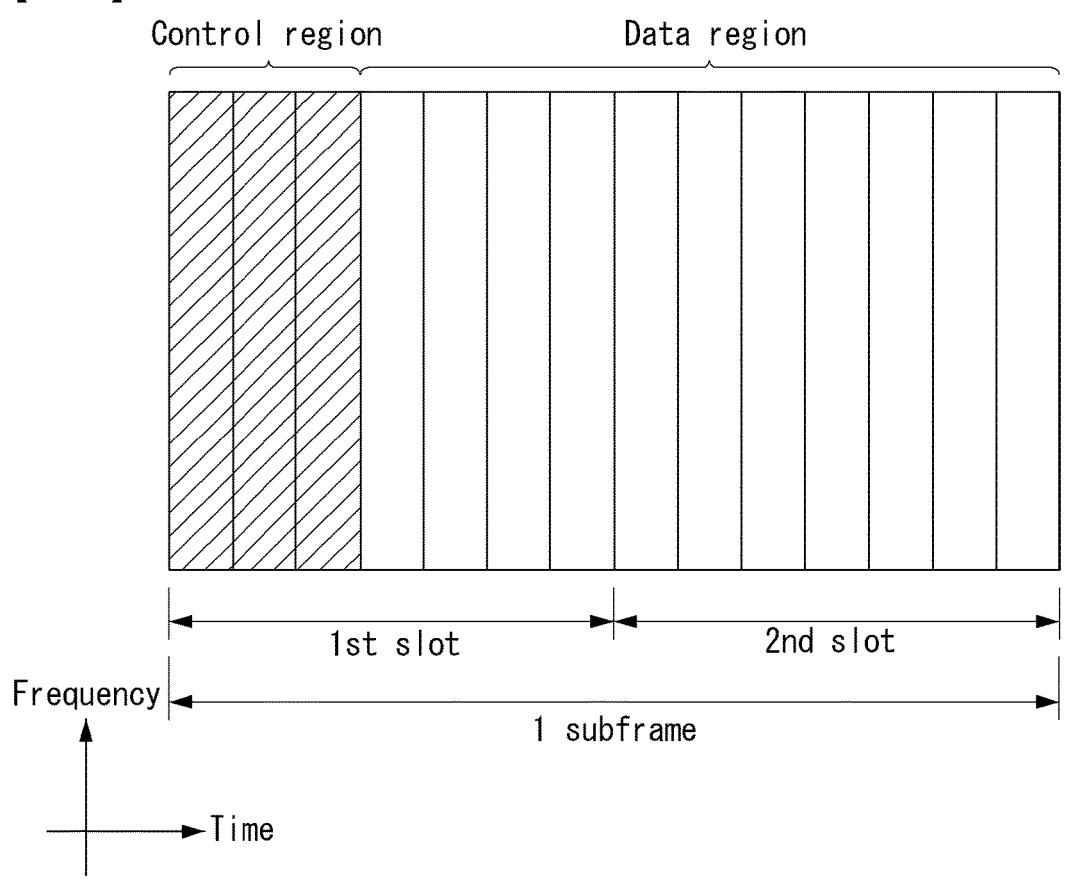
[FIG. 3]

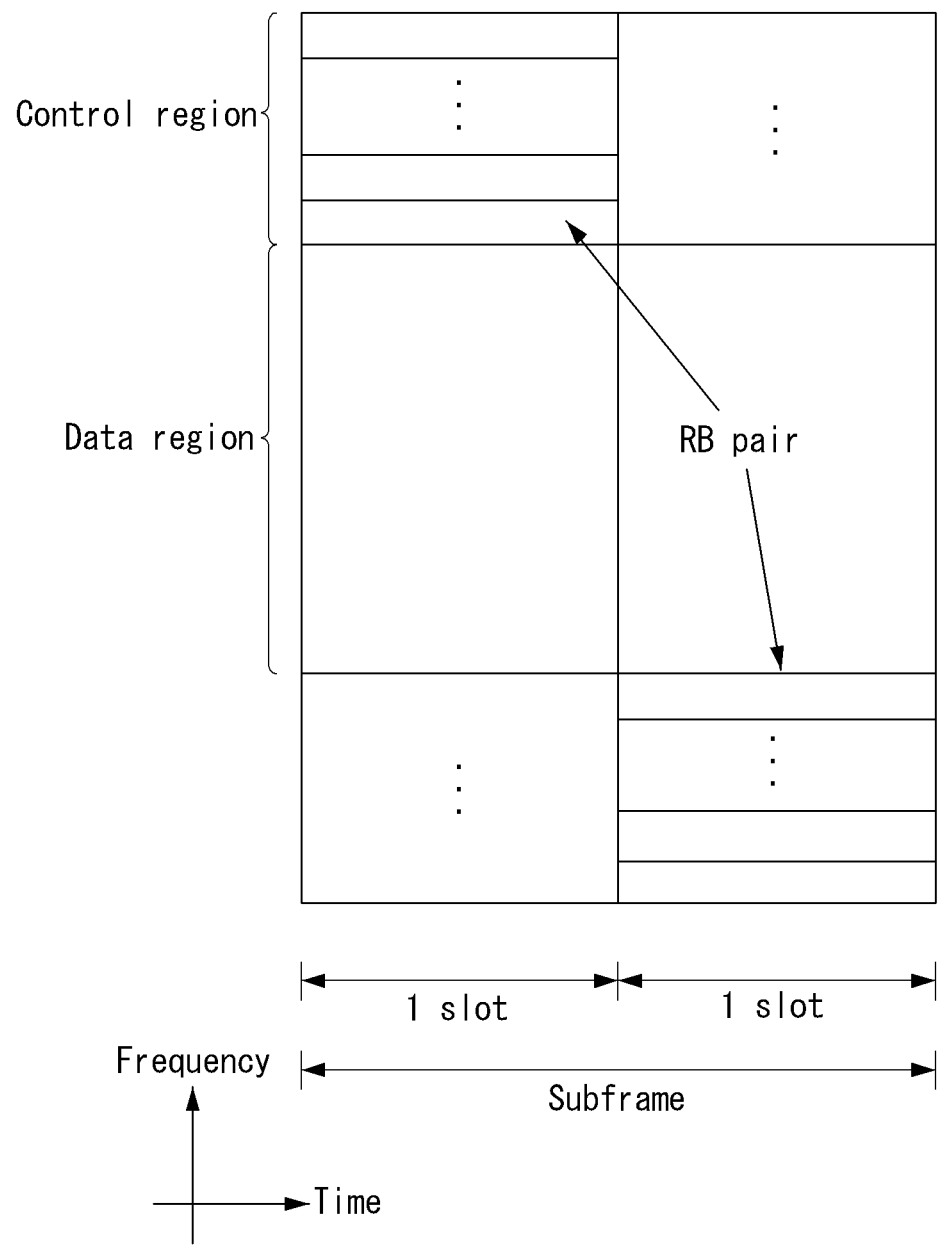

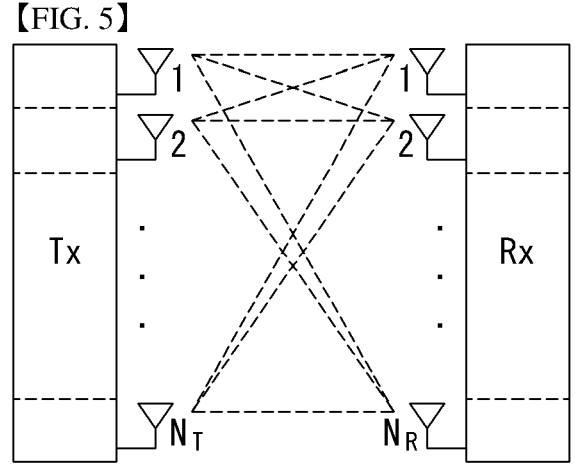
[FIG. 5]

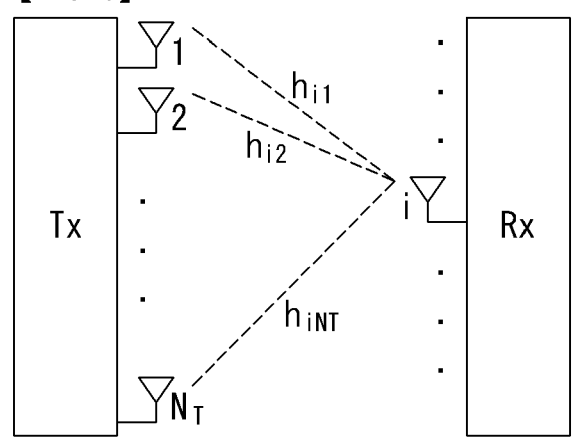
[FIG. 6]

[FIG. 7]
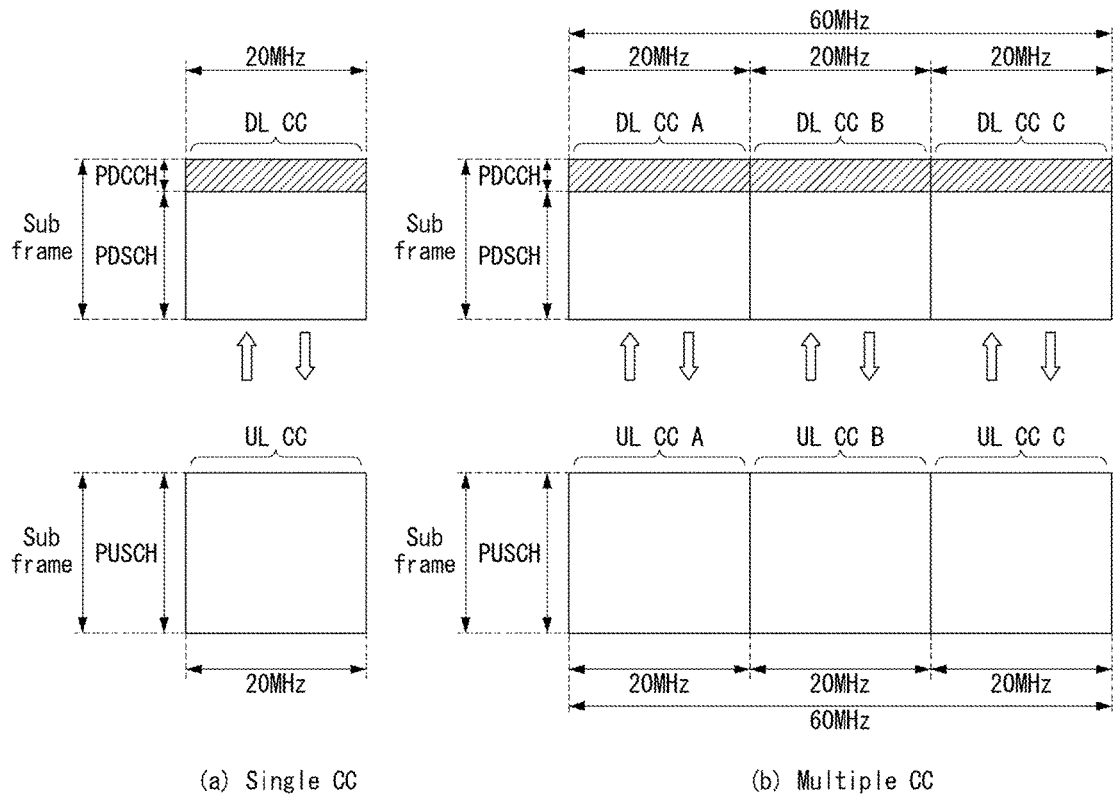

[FIG. 8]
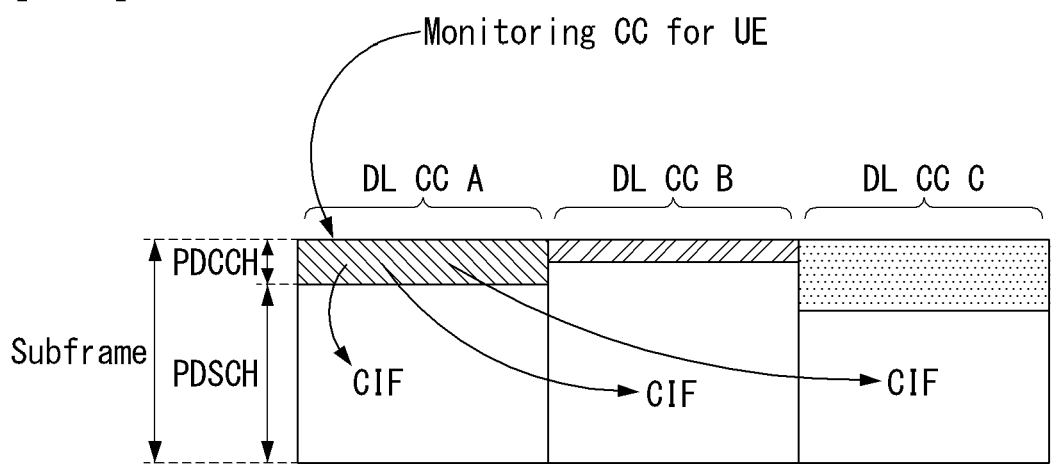

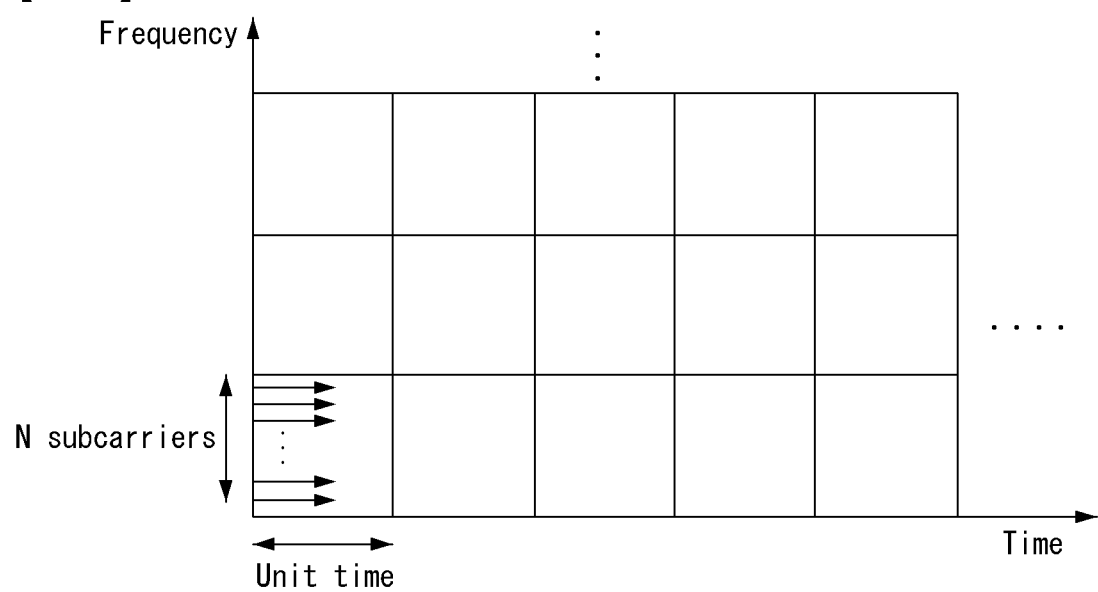
[FIG. 9]

[FIG. 10]
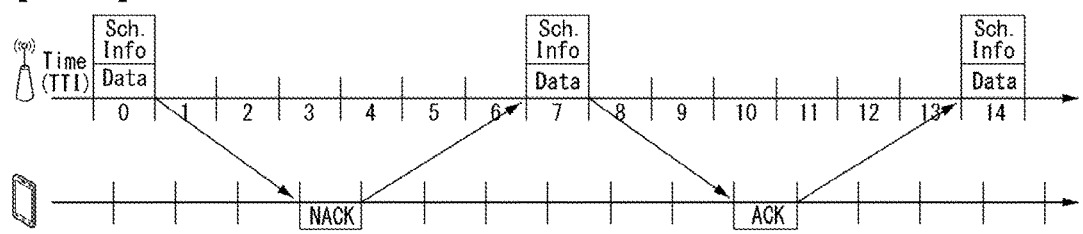

[FIG. 11]
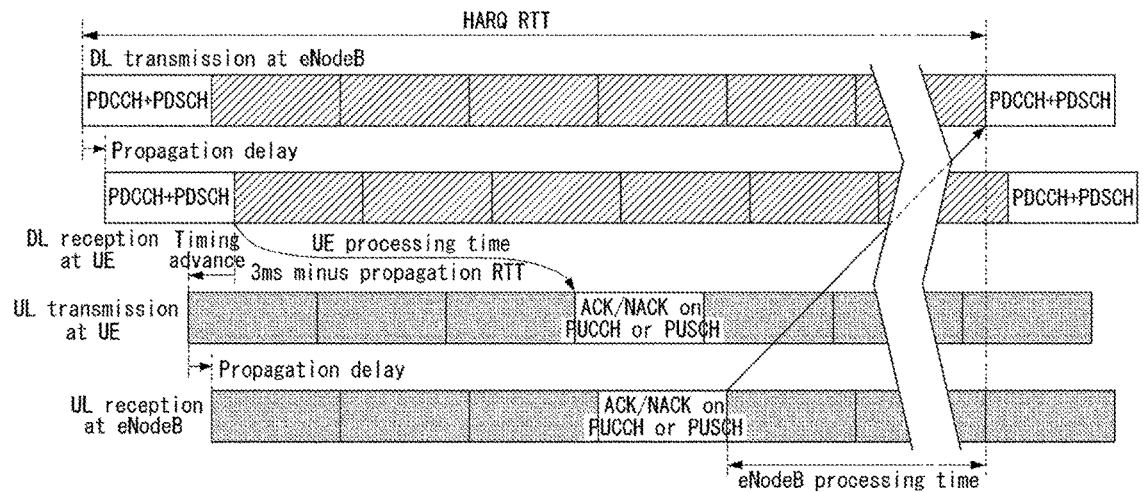

[FIG. 12]
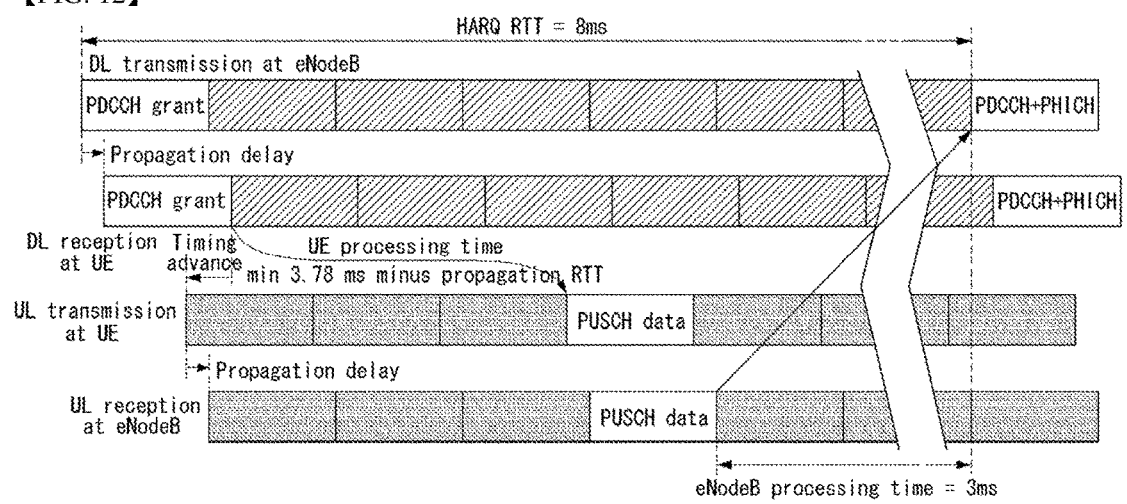

[FIG. 13]
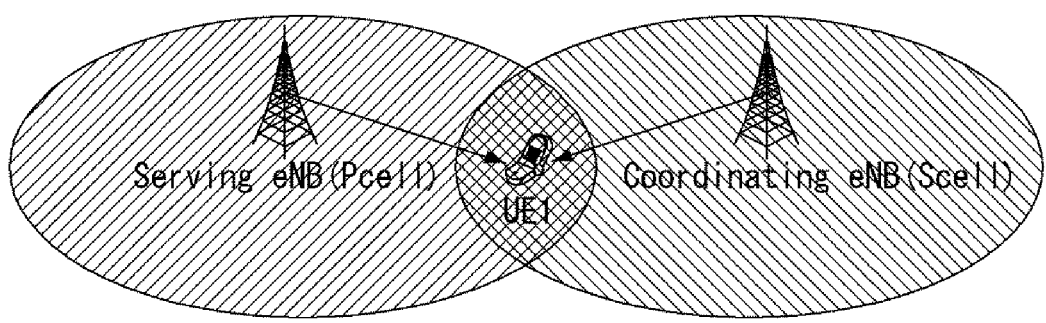
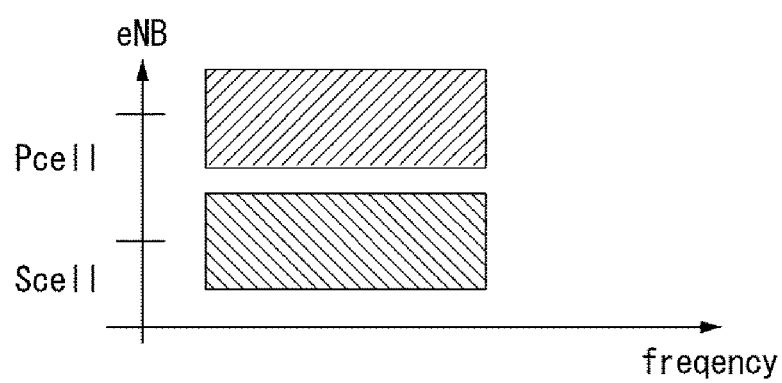

[FIG. 14]
(a) 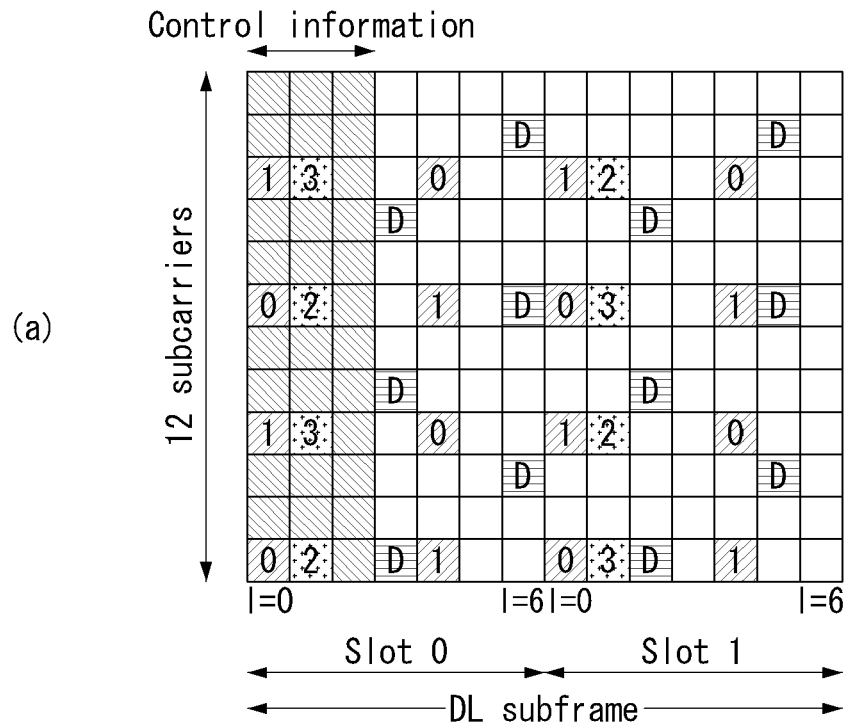
(b) 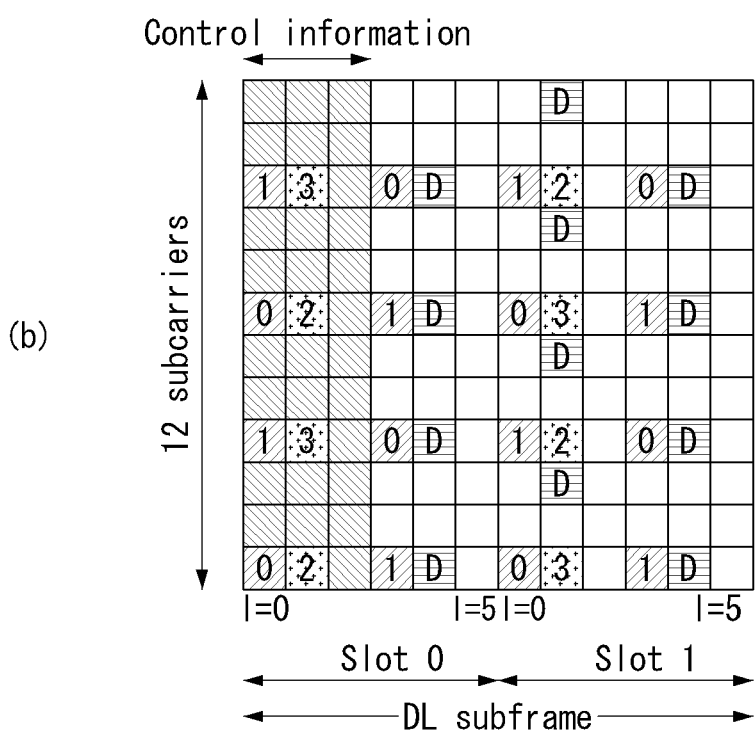

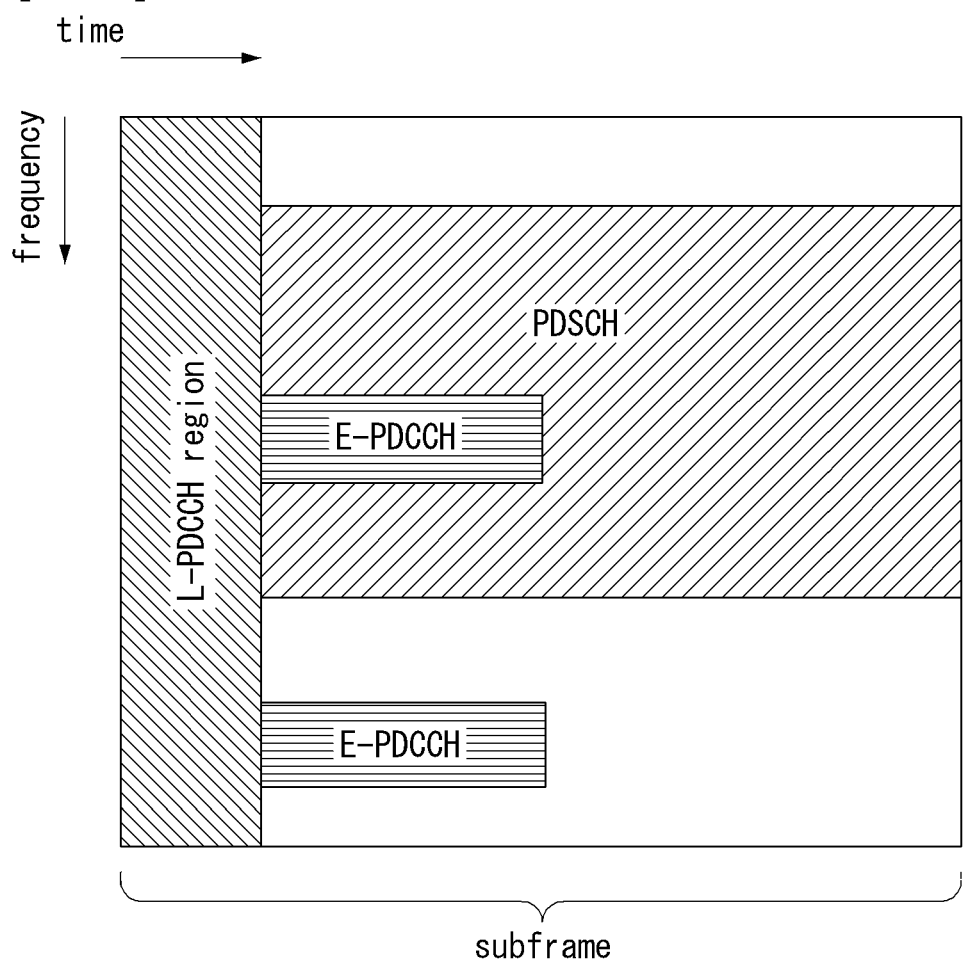
[FIG. 15]

[FIG. 16]
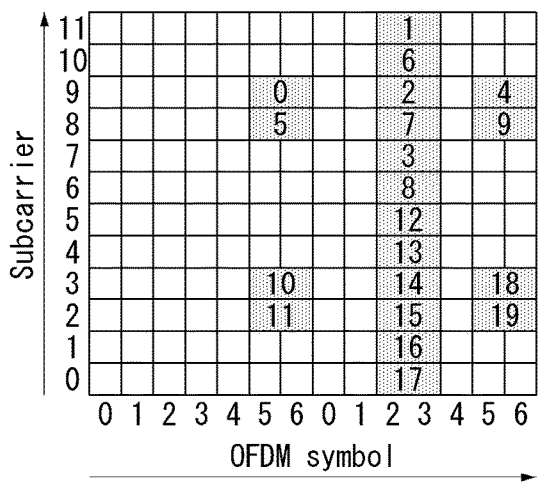
(a) 1 or 2 CSI-RS ports
☐ : CSI-RS configuration available for 1 or 2 CSI-RS ports
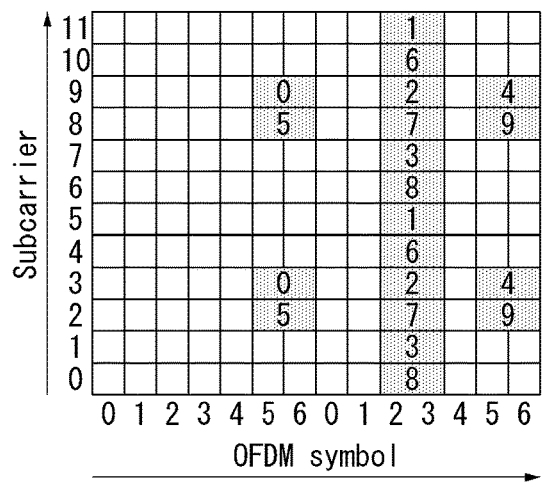
(b) 4 CSI-RS ports
☐ : CSI-RS configuration available for 4 CSI-RS ports
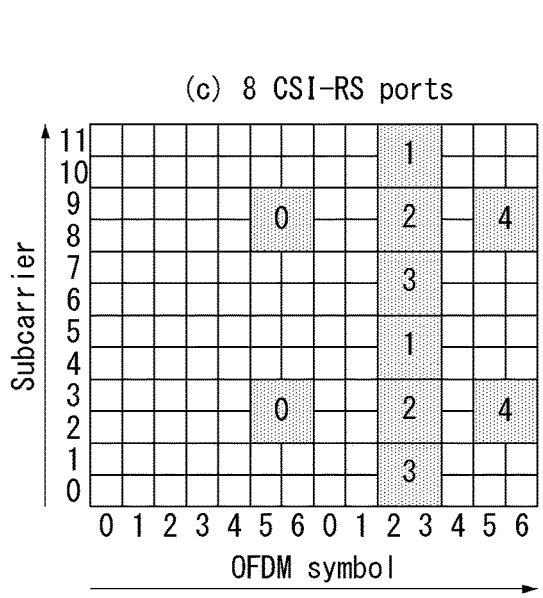
(c) 8 CSI-RS ports
☐ : CSI-RS configuration available for 8 CSI-RS ports 【FIG. 17】
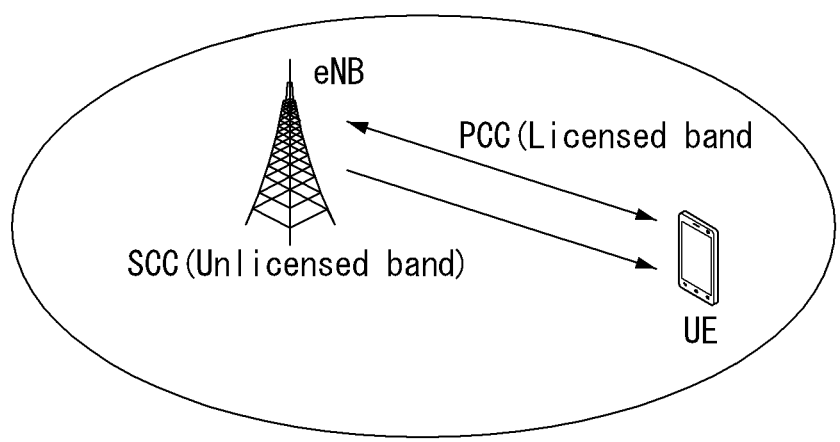

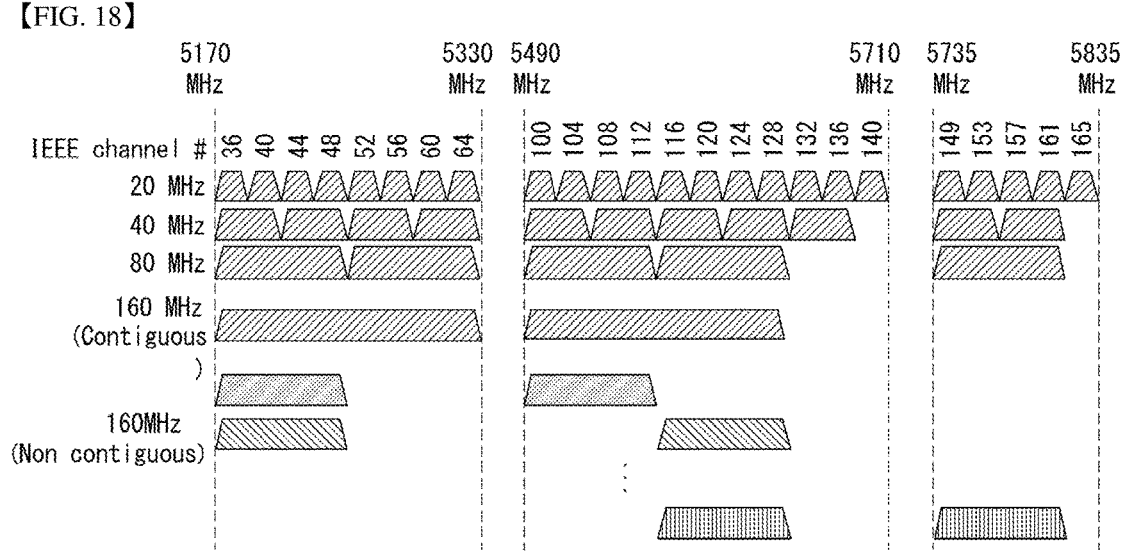
[FIG. 18]

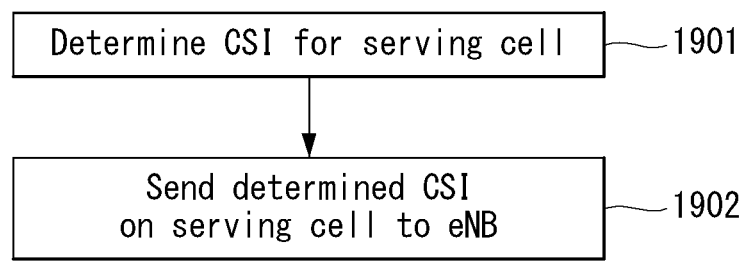
[FIG. 19]

[FIG. 20]
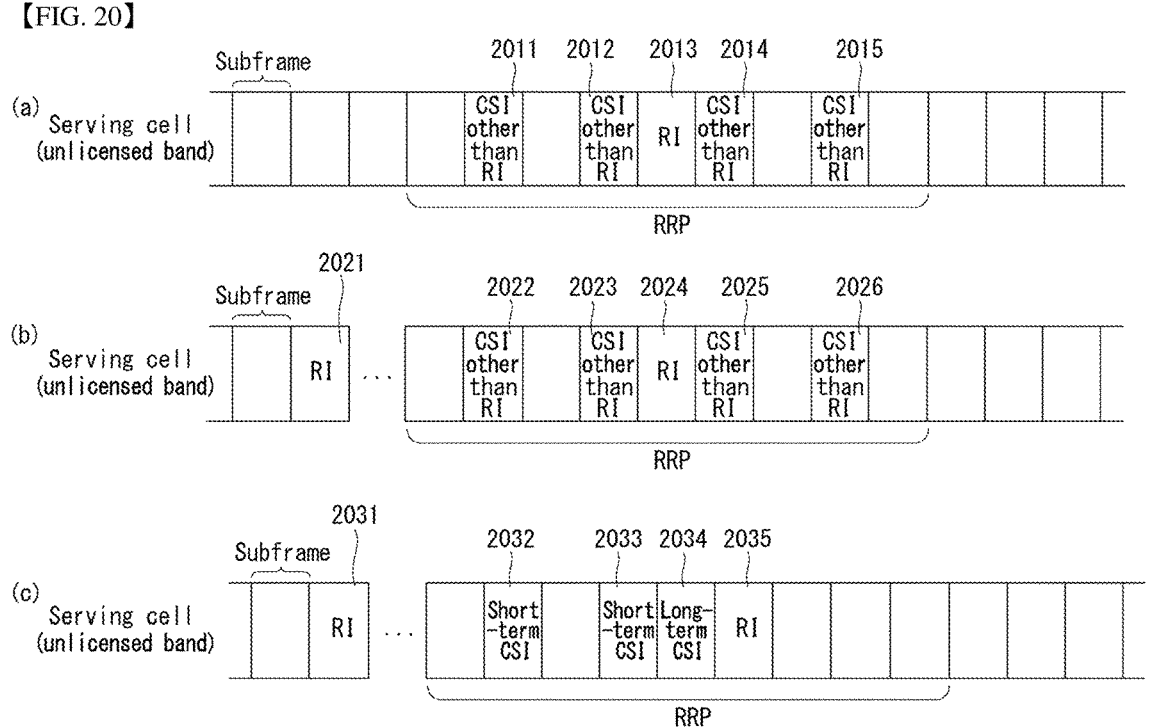

[FIG. 21]
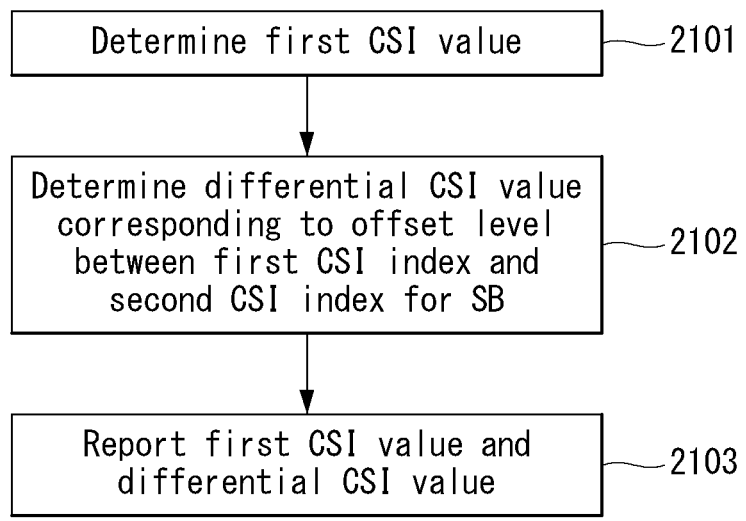

[FIG. 22]
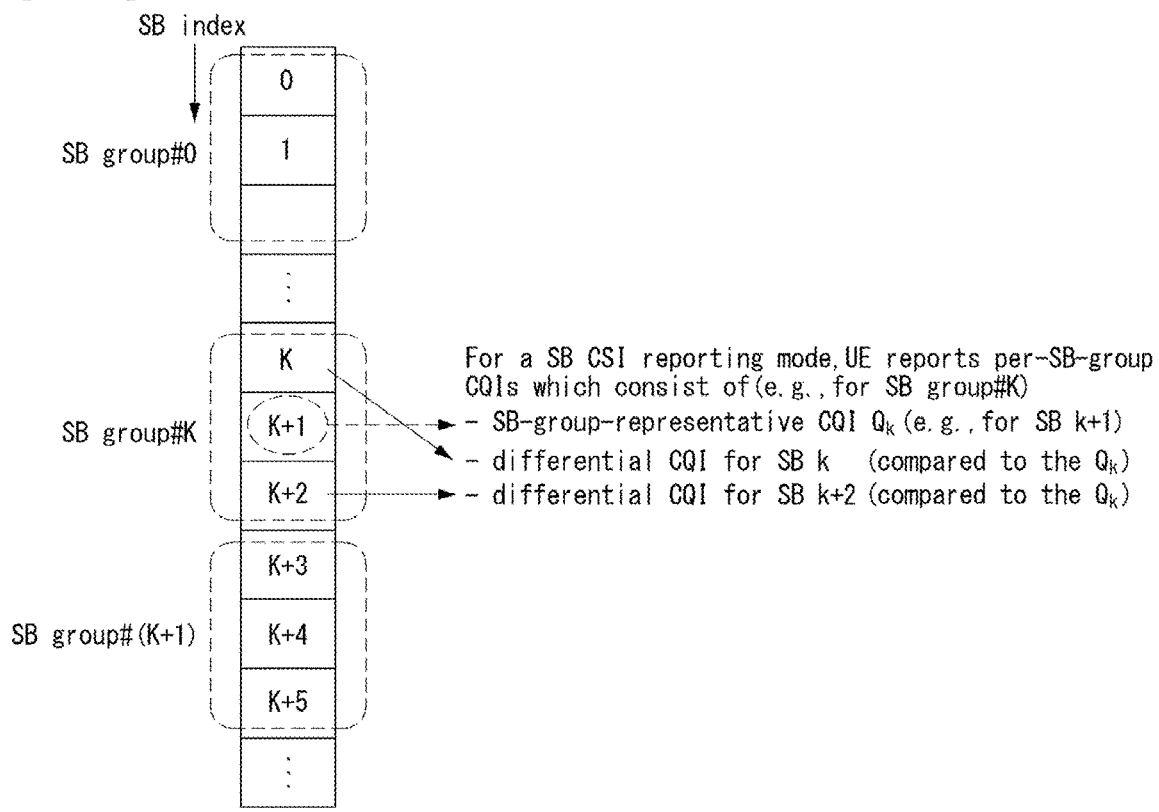

[FIG. 23]
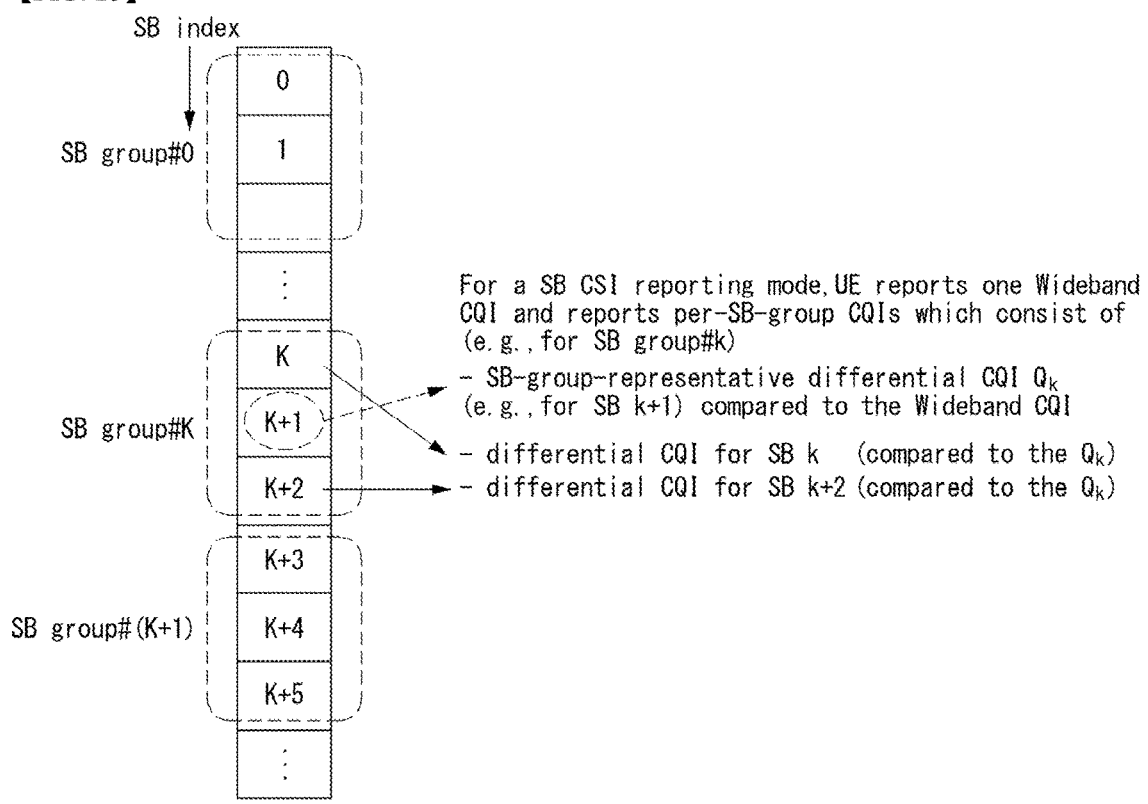

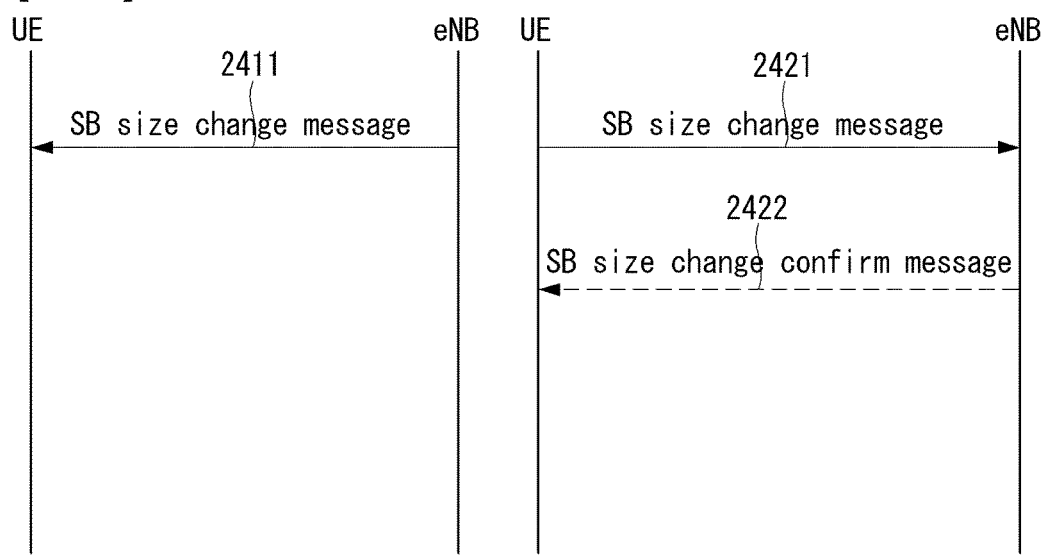
[FIG. 24]

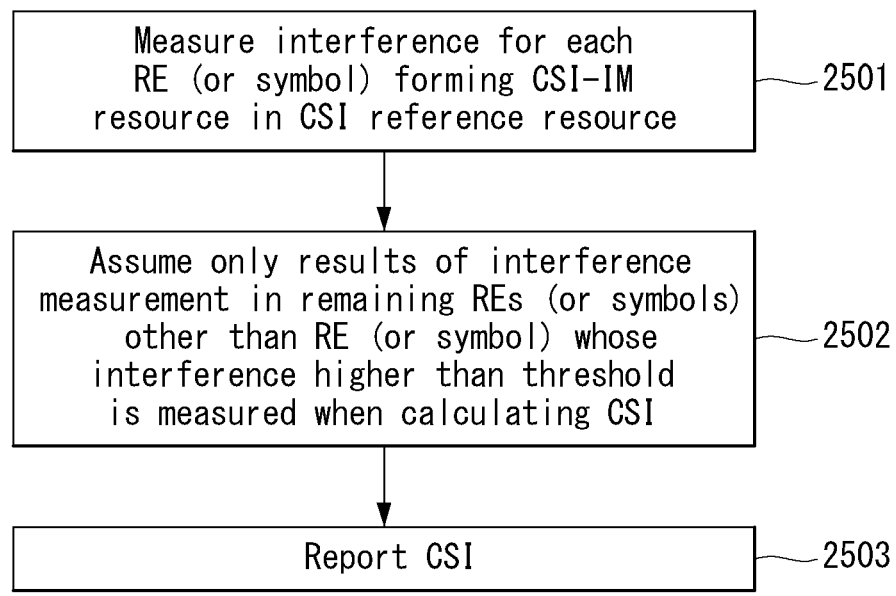
[FIG. 25]

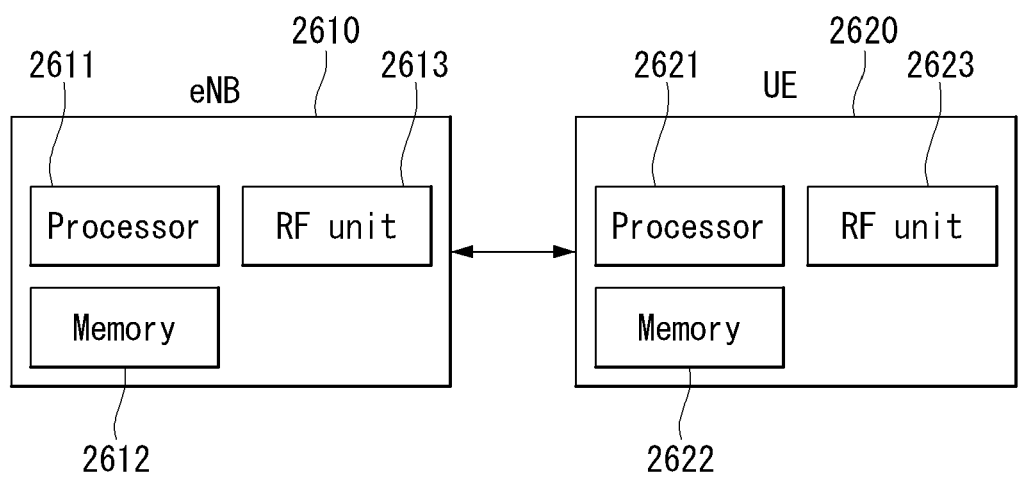
[FIG. 26]

METHOD FOR TRANSMITTING/RECEIVING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/007327, filed on Jul. 15, 2015, which claims the benefit of U.S. Provisional Application No. 62/025,455, filed on Jul. 16, 2014, the contents of which are all hereby incorporated by reference herein in their entirety.

TECHNICAL FIELD

The present invention relates to a wireless communication system and, more particularly, to a method for transmitting and receiving channel state information in a larger bandwidth, such as an unlicensed band, and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

There is a need for an advanced method for feeding channel state information back in order to support an operation, such as the application of a closed-loop transmission method, in a larger bandwidth, such as an unlicensed band/spectrum.

There is proposed a method for calculating, by UE, channel state information, in a larger bandwidth, such as an unlicensed band/spectrum, and reporting the calculated channel state information to an eNB.

Furthermore, an embodiment of the present invention proposes a method for reporting, by UE, channel state information in a time period occupied in an unlicensed band/spectrum.

Furthermore, an embodiment of the present invention proposes a method for reporting more accurate channel state information in a band in which strong interference may locally occur, such as an unlicensed band/spectrum.

Technical objects to be achieved by the present invention are not limited to the aforementioned objects, and those skilled in the art to which the present invention pertains may evidently understand other technical objects from the following description.

Technical Solution

In an aspect of the present invention, a method for transmitting, by UE, channel state information (CSI) in a wireless communication system may include determining CSI for a serving cell of an unlicensed band and transmitting the CSI at a periodic CSI reporting instance within a reserved resource period (RRP), that is, a time period occupied to transmit and receive data in the serving cell.

In another aspect of the present invention, user equipment transmitting channel state information (CSI) in a wireless communication system includes a radio frequency (RF) unit transmitting and receiving a radio signal and a processor controlling the user equipment. The processor may determine CSI for a serving cell of an unlicensed band and transmit the CSI at a periodic CSI reporting instance within a reserved resource period (RRP) which is a time period occupied to transmit and receive data in the serving cell.

Another CSI prior to an initial rank indication (RI) reporting instance within the RRP may be dropped or transmitted through an out of range (OOR) message.

If the latest RI reported prior to the RRP is reported within a specific time window, another CSI prior to an initial RI reporting instance within the RRP may be determined based on the latest RI.

The CSI may be transmitted on a physical uplink shared channel (PUSCH) and the periodic CSI reporting instance may be determined through a higher layer parameter.

The CSI may include a wideband CSI value and a subband differential CSI value. The subband differential CSI value may indicate an offset level between the wideband CSI value and a subband CSI value. The offset level may include an out of range (OOR) state indicating that scheduling is inappropriate in the subband.

The CSI may include a representative CSI value of a subband group and a subband differential CSI value within each subband group. The representative CSI value of the subband group may be determined as an average value or median of CSI values of subbands belonging to the subband group or a CSI value of any one of subbands belonging to the subband group. The subband differential CSI value may indicate an offset level between the representative CSI value of the subband group and a subband CSI value.

The offset level may include an out of range (OOR) state indicating that scheduling is inappropriate in the subband.

The CSI may include a wideband CSI value, a differential CSI value of a subband group, and a subband differential CSI value within each subband group. The differential CSI value of the subband group may indicate a first offset level between the wideband CSI value and a subband group CSI value. The subband differential CSI value may indicate a second offset level between the representative CSI value of the subband group and a subband CSI value. The representative CSI value of the subband group may be determined as an average value or median of CSI values of subbands belonging to the subband group or a CSI value of any one of subbands belonging to the subband group.

The first offset level may include an out of range (OOR) state indicating that scheduling is inappropriate in the subband group.

The differential CSI value of the subband group may include a bitmap in which each subband group is mapped to each bit. Whether scheduling in a corresponding subband group is appropriate may be indicated based on a bit value of the bitmap.

In a frequency domain, each subband size may be determined by control of an eNB or selectively determined by the UE.

The unit of a component carrier, that is, an object of the CSI to be reported, the unit of a component carrier, that is, an object of radio resource management (RRM) measurement, and the unit of a component carrier, that is, a physical downlink shared channel (PDSCH) object, may be independently determined.

When determining the CSI by the UE, the UE may assume only interference measured in a specific resource element/symbol of resource elements/symbols forming a CSI-interference measurement (IM) resource.

The CSI may include one or more of a channel quality indicator (CQI), a precoding matrix indicator (PMI), a rank indication (RI), and a precoding type indicator (PTI).

Advantageous Effects

In accordance with an embodiment of the present invention, UE can calculate channel state information in a larger bandwidth, such as an unlicensed band/spectrum, and report the calculated channel state information to an eNB.

Furthermore, in accordance with an embodiment of the present invention, UE can report channel state information in a time period occupied in an unlicensed band/spectrum.

Furthermore, in accordance with an embodiment of the present invention, more accurate channel state information can be reported in a band in which strong interference may locally occur, such as an unlicensed band/spectrum.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates the structure of a radio frame in a wireless communication system to which an embodiment of the present invention may be applied.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 shows an example of the structure of a subframe according to cross-carrier scheduling in a wireless communication system to which an embodiment of the present invention may be applied.

FIG. 9 is a diagram illustrating a time-frequency resource block in a time frequency domain in a wireless communication system to which an embodiment of the present invention may be applied.

FIG. 10 is a diagram illustrating a resource allocation and retransmission process of an asynchronous HARQ method in a wireless communication system to which an embodiment of the present invention may be applied.

FIG. 11 is a diagram showing a downlink HARQ process in an LTE FDD system to which an embodiment of the present invention may be applied.

FIG. 12 is a diagram showing an uplink HARQ process in an LTE FDD system to which an embodiment of the present invention may be applied.

FIG. 13 is a diagram illustrating a carrier aggregation-based CoMP system in a wireless communication system to which an embodiment of the present invention may be applied.

FIG. 14 illustrates a reference signal pattern mapped to a downlink resource block pair in a wireless communication system to which an embodiment of the present invention may be applied.

FIG. 15 is a diagram illustrating a PDCCH and E-PDCCHs in a wireless communication system to which an embodiment of the present invention may be applied.

FIG. 16 is a diagram illustrating a CSI-RS configuration in a wireless communication system to which an embodiment of the present invention may be applied.

FIG. 17 is a diagram illustrating a carrier aggregation in an unlicensed band/spectrum according to an embodiment of the present invention.

FIG. 18 is a diagram illustrating channelization in an unlicensed band/spectrum to which an embodiment of the present invention may be applied.

FIGS. 19 to 21 are diagrams illustrating a method for transmitting channel state information according to an embodiment of the present invention.

FIGS. 22 and 23 are diagrams illustrating a method for reporting a subband CQI according to an embodiment of the present invention.

FIG. 24 is a diagram illustrating a method for configuring a subband according to an embodiment of the present invention.

FIG. 25 is a diagram illustrating a method for transmitting channel state information according to an embodiment of the present invention.

FIG. 26 illustrates a block diagram of a wireless communication apparatus according to an embodiment of the present invention.

MODE FOR INVENTION

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

In FIG. 1, the size of the radio frame in the time domain is represented by a multiple of time unit of $T\_s=(1/15000*2048)$. The downlink and uplink transmissions are composed of radio frames having intervals of $T\_f=307200*T\_s=10$ ms.

FIG. 1($a$) illustrates the radio frame structure type 1. Type 1 radio frames can be applied to both full duplex FDD and half duplex FDD.

A radio frame consists of 10 subframes. One radio frame is composed of 20 slots having a length of $T\_slot=15360*T\_s=0.5$ ms, and each slot is given an index from 0 to 19. One subframe consists of two consecutive slots in the time domain, and the subframe i consists of slots 2i and 2i+1. The time taken to send one subframe is called a Transmission Time Interval (TTI). For example, one subframe may have a length of 1 ms, and one slot may have a length of 0.5 ms.

In the FDD, the uplink transmission and the downlink transmission are classified in the frequency domain. There is no limitation on full-duplex FDD, whereas the UE cannot transmit and receive simultaneously in half-duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1($b$) illustrates the frame structure type 2.

The Type 2 radio frame consists of two half frames each having a length of $153600*T\_s=5$ ms. Each half frame consists of 5 subframes with a length of $30720*T\_s=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, Table 2 shows the configuration (DwPTS/GP/UpPTS length) of the special subframe.

TABLE 1

| | Normal cyclic prefix in downlink | | | Extended cyclic prefix in downlink | | |
|---|---|---|---|---|---|---|
| | | UpPTS | | | UpPTS | |
| | | Normal cyclic prefix in uplink | Extended cyclic prefix in uplink | | Normal cyclic prefix in uplink | Extended cyclic prefix in uplink |
| Special subframe configuration | DwPTS | | | DwPTS | | |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

"U" is indicative of a subframe for uplink transmission, and "S" is indicative of a special subframe including three types of a Downlink Pilot Time Slot (DwPTS), a Guard Period (GP), and an Uplink Pilot Time Slot (UpPTS).

The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

Each subframe i is composed of a slot 2i and a slot 2i+1 each having a length of $T\_slot=15360*T\_s=0.5$ ms.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all pieces of UE within a cell through a broadcast channel as broadcasting information.

The structure of a radio frame according to the example of FIG. 1 is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment Ri by a maximum transfer rate Ro if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Transmission power may be different in each of pieces of transmission information $s\_1, s\_2, \ldots, s\_NT$. In this case, if pieces of transmission power are $P\_1, P\_2, \ldots, P\_NT$, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals $x\_1, x\_2, \ldots, x\_NT$ that are actually transmitted. In this case, the weight matrix functions to properly distribute the transmission information to antennas according to a transport channel condition. The following may be represented using the transmission signals $x\_1, x\_2, \ldots, x\_NT$.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T^2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals $y\_1, y\_2, \ldots, y\_NR$ of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R^2} & \cdots & h_{N_R N_T} \end{bmatrix} \quad \text{[Equation 8]}$$

Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and a carrier aggregation in a wireless communication system to which an embodiment of the present invention may be applied.

FIG. 7a shows the structure of a single carrier used in an LTE system. A component carrier includes a DL CC and an UL CC. One component carrier may have a frequency range of 20 MHz.

FIG. 7b shows the structure of a carrier aggregation used in an LTE-A system. FIG. 7b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Cross-Carrier Scheduling

In a carrier aggregation system, there are two types of a self-scheduling method and a cross-carrier scheduling method from a viewpoint of scheduling for a carrier or serving cell. Cross-carrier scheduling may be called cross component carrier scheduling or cross cell scheduling.

Cross-carrier scheduling means that a PDCCH (DL grant) and a PDSCH are transmitted on different DL CCs or that a PUSCH transmitted according to a PDCCH (UL grant) transmitted in a DL CC is transmitted on an UL CC different from an UL CC link to a DL CC on which the UL grant has been received.

Whether cross-carrier scheduling is to be performed may be activated or deactivated in a UE-specific manner, and each piece of UE may be semi-statically notified of whether cross-carrier scheduling is to be performed through higher layer signaling (e.g., RRC signaling).

If cross-carrier scheduling is activated, there is a need for a carrier indicator field (CIF), providing notification that a PDSCH/PUSCH indicated by a corresponding PDCCH is transmitted through which DL/UL CC, in a PDCCH. For example, a PDCCH may allocate a PDSCH resource or a PUSCH resource to any one of a plurality of CCs using a CI. That is, a CIF is set if a PDCCH on a DL CC allocates a PDSCH or PUSCH resource on one of multiple DL/UL CCs which have been aggregated. In this case, the DCI format of LTE-A Release-8 may be extended according to the CIF. In this case, the set CIF may be fixed to a 3-bit field and the position of the set CIF may be fixed regardless of the size of the DCI format. Furthermore, the PDCCH structure (the same coding and the same CCE-based resource mapping) of LTE-A Release-8 may be reused.

In contrast, if a PDCCH on a DL CC allocates a PDSCH resource on the same DL CC or allocates a PUSCH resource on one linked UL CC, a CIF is not set. In this case, the same PDCCH structure (the same coding and the same CCE-based resource mapping) and DCI format as those of LTE-A Release-8 may be used.

If cross-carrier scheduling is possible, UE needs to monitor a PDCCH for a plurality of DCIs in the control region of a monitoring CC depending on the transmission mode and/or bandwidth of each CC. Accordingly, there is a need for the configuration of a search space capable of supporting such a need and for PDCCH monitoring.

In a carrier aggregation system, a UE DL CC set is indicative of a set of DL CC that has been scheduled for UE to receive a PDSCH, and a UE UL CC set is indicative of a set of UL CCs that has been scheduled for UE to send a PUSCH. Furthermore, a PDCCH monitoring set is indicative of a set of at least one DL CC on which PDCCH monitoring is performed. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. A DL CC included in the PDCCH monitoring set may be configured to be always self-scheduled for a linked UL CC. Such a UE DL CC set, UE UL CC set and PDCCH monitoring set may be configured in a UE-specific, UE group-specific or cell-specific manner.

If cross-carrier scheduling has been deactivated, it means that a PDCCH monitoring set is always the same as a UE DL CC set. In such a case, indication, such as separate signaling for the PDCCH monitoring set, is not required. If cross-carrier scheduling has been activated, however, a PDCCH monitoring set may be defined within a UE DL CC set. That is, in order to schedule a PDSCH or a PUSCH for UE, an eNB sends a PDCCH through only the PDCCH monitoring set.

FIG. 8 shows an example of the structure of a subframe according to cross-carrier scheduling in a wireless communication system to which an embodiment of the present invention may be applied.

Referring to FIG. 8, 3 DL CCs are aggregated in a DL subframe for LTE-A UE. A DL CC "A" indicates a case where the DL CC has been configured as a PDCCH monitoring DL CC. If a CIF is not used, each DL CC may send a PDCCH for scheduling its own PDSCH without a CIF. In contrast, if a CIF is used through higher layer signaling, only one DL CC "A" may send a PDCCH for scheduling its own PDSCH or the PDSCH of another CC using a CIF. In this case, DL CCs "B" and "C" not configured as a PDCCH monitoring DL CC do not send a PDCCH.

Hybrid—Automatic Repeat and Request (HARQ)

In a mobile communication system, one eNB sends and receives data to and from a plurality of UEs in one cell/sector through a wireless channel environment.

In a system in which multiple carriers operate or a system operating in a form similar to the system, an eNB receives packet traffic over a wired Internet and sends the received packet traffic to UE using a predetermined communication method. In this case, it is a downlink scheduling that the eNB determines to send data to which UE using which frequency domain at which timing.

Furthermore, the eNB receives data from the UE using a predetermined communication method, demodulates the received data, and sends packet traffic through the wired Internet. It is an Uplink scheduling that the eNB determines to allow which UE to send uplink data using which frequency band at which timing. In general, UE having a better channel state sends and receives data using more time and more frequency resources.

FIG. 9 is a diagram illustrating a time-frequency resource block in a time frequency domain in a wireless communication system to which an embodiment of the present invention may be applied.

Resources in a system in which multiple carriers operate and a system operating in a form similar to the system may be basically divided into a time domain and a frequency domain. The resources may be defined as resource blocks. The resource block includes specific N subcarriers and specific M subframes or a predetermined time unit. In this case, N and M may be 1.

In FIG. 9, one square means one resource block, and one resource block use several subcarriers as one axis and a predetermined time unit as the other axis. In downlink, an eNB schedules one or more resource blocks for selected UE according to a predetermined scheduling rule, and sends data to the UE using allocated resource blocks. In uplink, an eNB schedules one or more resource blocks to selected UE according to a predetermined scheduling rule, and the UE sends data using the allocated resource in uplink.

After the scheduling and the data is transmitted, an error control method if a frame is lost or damaged includes an automatic repeat request (ARQ) method and a hybrid ARQ (HARQ) method of a more advanced form.

Basically, in the ARQ method, after one frame is transmitted, a transmission side waits for an acknowledgement message (ACK). A reception side sends an acknowledgement message (ACK) only when the frame is successfully received. If an error is generated in the received frame, the reception side sends a negative-ACK (NACK) message again and deletes information about the received frame having an error from a reception end buffer. When an ACK signal is received, a transmission side sends a subsequent frame. When a NACK message is received, the transmission side resends a corresponding frame.

Unlike in the ARQ method, in the HARQ method, if a received frame cannot be demodulated, a reception end sends a NACK message to a transmission end, but stores an already received frame in a buffer during a specific time and combines the stored frame with a previously received from when the corresponding frame is retransmitted, thereby increasing a success rate of reception.

Recently, the HARQ method more efficient than the basic ARQ method is widely used. Such an HARQ method includes several types. The HARQ method may be basically divided into synchronous HARQ and asynchronous HARQ depending on retransmission timing and may be divided into a channel-adaptive method and a channel-non-adaptive method depending on whether a channel state is incorporated into the amount of resources used upon retransmission.

In the synchronous HARQ method, when initial transmission fails, subsequent retransmission is performed by a system according to predetermined timing. That is, assuming that timing upon retransmission is performed every fourth time unit after an initial transmission failure, an eNB and UE do not need to be additionally notified of such timing because the timing has already been agreed between the eNB and the UE. In this case, if a data transmission side has received an NACK message, it retransmits a frame every fourth time unit until it receives an ACK message.

In contrast, in the asynchronous HARQ method, retransmission timing may be newly scheduled or may be performed through additional signaling. Timing when retransmission for a previously failed frame is performed is changed depending on several factors, such as a channel state.

In the channel-non-adaptive HARQ method, the modulation of a frame upon retransmission, the number of resource blocks, and adaptive modulation and coding (AMC) are performed as they have been predetermined upon initial transmission. In contrast, in the channel-adaptive HARQ method, the modulation of a frame upon retransmission, the number of resource blocks, and adaptive modulation and coding (AMC) are performed are changed depending on the state of a channel. For example, in the channel-non-adaptive HARQ method, a transmission side sends data using 6 resource blocks upon initial transmission and performs retransmission using 6 resource blocks upon subsequent retransmission in the same manner. In contrast, in the channel-adaptive HARQ method, although transmission has been performed using 6 resource blocks, retransmission is subsequently performed using resource blocks greater than or smaller than the 6 resources blocks depending on a channel state.

Four HARQ combinations may be performed based on such a classification, but a HARQ method that are used primarily includes an asynchronous and channel-adaptive HARQ method and a synchronous and channel-non-adaptive HARQ method.

The asynchronous and channel-adaptive HARQ method can maximize retransmission efficiency because retransmission timing and the amount of resources used are adaptively changed depending on the state of a channel, but has a disadvantage in that overhead is increased. Accordingly, the asynchronous and channel-adaptive HARQ method is not taken into consideration in common for uplink.

The synchronous and channel-non-adaptive HARQ method is advantageous in that overhead for timing for retransmission and resource allocation is rarely present because the timing for retransmission and the resource allocation have been predetermined within a system, but is disadvantageous in that retransmission efficiency is very low if such a method is used in a channel state that varies severely.

FIG. 10 is a diagram illustrating a resource allocation and retransmission process of the asynchronous HARQ method in a wireless communication system to which an embodiment of the present invention may be applied.

For example, in the case of downlink, after scheduling is performed and data is transmitted, ACK/NACK information is received from UE. Time delay is generated until next data is transmitted as shown in FIG. 10. The time delay is generated due to channel propagation delay and the time taken for data decoding and data encoding.

For such a delay period, a method for sending data using an independent HARQ process is used for blankless data transmission. For example, if the shortest cycle between next data transmission and subsequent data transmission is 7 subframes, data may be transmitted without a blank if 7 independent processes are placed in the 7 subframes.

An LTE physical layer supports HARQ in a PDSCH and a PUSCH and associated reception acknowledge (ACK) feedback in a separate control channel is transmitted.

In an LTE FDD system, if the LTE FDD system does not operate in MIMO, 8 stop-and-wait (SAW) HARQ processes are supported in uplink and downlink both in a constant round trip time (RTT) of 8 ms.

FIG. 11 is a diagram showing a downlink HARQ process in an LTE FDD system to which an embodiment of the present invention may be applied, and FIG. 12 is a diagram showing an uplink HARQ process in an LTE FDD system to which an embodiment of the present invention may be applied.

Each HARQ process is defined by a unique HARQ process identifier (HARQ ID) of a 3-bit size. A reception end (i.e., UE in a downlink HARQ process and an eNodeB in an uplink HARQ process) requires individual soft buffer allocation for the combination of retransmitted data.

Furthermore, for an HARQ operation, a new data indicator (NDI), a redundancy version (RV), and a modulation and coding scheme (MCS) field are defined within downlink control information. The NDI field is toggled whenever new packet transmission starts. The RV field indicates an RV selected for transmission or retransmission. The MCS field indicates an MCS level.

In an LTE system, a downlink HARQ process is an adaptive asynchronous method. Accordingly, downlink control information for an HARQ process is explicitly accompanied every downlink transmission.

In an LTE system, an uplink HARQ process is a synchronous method and may include an adaptive or non-adaptive method. The uplink non-adaptive HARQ scheme requires a preset RV sequence (e. g., 0, 2, 3, 1, 0, 2, 3, 1, . . . ) for consecutive packet transmission because it does not accompany the explicit signaling of control information. In contrast, in the uplink adaptive HARQ scheme, an RV is explicitly signaled. In order to minimize control signaling, uplink mode in which an RV (or MCS) is combined with another control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

An object of the limited buffer rate matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of UE, the code bit is transmitted in the virtual circular buffer (VCB) that may be stored in the HARQ soft buffer of the UE for all of the given TB (re)transmissions.

Coordinated Multi-Point Transmission and Reception (CoMP)

In accordance with the demand of LTE-advanced, CoMP transmission is proposed to enhance performance of a system.

CoMP is referred to as a scheme for two or more eNBs, (Access) Points or Cells cooperate with each other and communicate with UE in order to perform smoothly communication between a specific UE and an eNB, (Access) Point or Cell. The CoMP is also called co-MIMO, collaborative MIMO, network MIMO, and the like. It is anticipated that the CoMP will improve performance of UE positioned at a cell boundary and improve an average throughput of the cell (sector).

In this specification, an eNB, an access point, and a cell are used as the same meaning.

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in the cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a coordinated scheduling/beamforming (CS/CB) method.

In case of JP method, the data headed from each eNB that performs the CoMP to UE is transmitted to UE instantaneously and simultaneously, and the UE combines the signal from each of the eNBs so as to improve the reception performance. Meanwhile, in the case of the CS/CB, the data headed to UE is transmitted instantaneously through a single eNB, and the scheduling or beamforming is performed such that the interference exerted on another eNB by the UE becomes the minimum.

In the JP method, data may be used in each point (i.e, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

CA-Based CoMP Operation

In system subsequent to LTE, cooperative multi-point (CoMP) transmission may be implemented using a carrier aggregation (CA) function in LTE.

FIG. 13 is a diagram illustrating a carrier aggregation-based CoMP system in a wireless communication system to which an embodiment of the present invention may be applied.

FIG. 13 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 13 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.

A cell-specific reference signal (CRS)

A multicast-broadcast single-frequency network reference signal (MBSFN RS)

A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in $\Delta f=15$ kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, . . . , υ+6. In this case, υ is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in $\Delta f=15$ kHz.

The CSI-RS is transmitted in 1, 2, 4 or 8 antenna ports using p=15, p=15, 16, p=15, . . . , 18 and p=15, . . . , 22, respectively.

The CSI-RS is defined only in $\Delta f=15$ kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

FIG. 14 illustrates a reference signal pattern mapped to a downlink resource block pair in the wireless communication system to which an embodiment of the present invention may be applied.

Referring to FIG. 14, as a unit in which the reference signal is mapped, the downlink resource block pair may be expressed by one subframe in the time domain x 12 subcarriers in the frequency domain. That is, one resource block pair has a length of 14 OFDM symbols in the case of a normal cyclic prefix (CP) (FIG. 14(a)) and a length of 12 OFDM symbols in the case of an extended cyclic prefix (CP) (FIG. 14(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (eNB). The RSs are transmitted based on maximum 4 antenna ports depending on the number of transmitting antennas of an eNB in the 3GPP LTE system (for example, release-8). The transmitter side has three types of antenna arrays of three single transmitting antennas, two transmitting antennas, and four transmitting antennas. For instance, in case that the number of the transmitting antennas of the eNB is 2, CRSs for antenna #1 and antenna #2 are transmitted. For another instance, in case that the number of the transmitting antennas of the eNB is 4, CRSs for antennas #1 to #4 are transmitted.

When the eNB uses the single transmitting antenna, a reference signal for a single antenna port is arrayed.

When the eNB uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the eNB uses four transmitting antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping a CRS to a resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. N_symb^DL represents the number of OFDM symbols in one downlink slot and N_RB^DL represents the number of radio resources allocated to the downlink. n_s represents a slot index and, N_ID^Cell represents a cell ID. mod represents an modulo operation. The position of the reference signal varies depending on the v_shift value in the frequency domain. Since v_shift depends on the cell ID (i.e., physical layer cell ID), the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DM-RS is described in more detail, the DM-RS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DM-RS for rank 1 beamforming is defined. The DM-RS for the rank 1 beamforming also means a reference signal for antenna port index 5.

A rule of mapping the DM-RS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB}$$ [Equation 13]

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB}$$ [Equation 14]

$$k' = \begin{cases} 3m' + v_{shift} & \text{if } l \leq 4 \\ 3m' + (2 + v_{shift}) \bmod 3 & \text{if } l \in 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l indicate a subcarrier index and a symbol index, respectively, and p indicates an antenna port. N_sc^RB indicates the size of the resource block in the frequency domain and is expressed as the number of subcarriers. n_PRB indicates the number of physical resource blocks. N_RB^PDSCH indicates a frequency band of the resource block for the PDSCH transmission. n_s indicates the slot index and N_ID^cell indicates the cell ID. mod indicates the modulo operation. The position of the reference signal varies depending on the v_shift value in the frequency domain. Since v_shift depends on the cell ID (i.e., physical layer cell ID), the position of the reference signal has various frequency shift values according to the cell.

Channel State Information (CSI) Feedback

An MIMO method may be divided into an open-loop method and a closed-loop method. The open-loop MIMO method means that a transmitting end performs MIMO transmission without the feedback of CSI from an MIMO receiving end. The closed-loop MIMO method means that an MIMO transmitting end receives CSI fed back by an MIMO receiving end and performs MIMO transmission. In the closed-loop MIMO method, in order to obtain a multiplexing gain of an MIMO transmit antenna, beamforming may be performed based on pieces of CSI from a transmitting end and a receiving end, respectively. A transmitting end (e.g., an eNB) may allocate an uplink control channel or an uplink shared channel to a receiving end (e.g., UE) so that the receiving end (e.g., UE) can feed CSI back.

Fed-back CSI may include a rank indicator (RI), a precoding matrix index (PMI), a precoding type indicator (PTI) and/or a channel quality indicator (CQI).

The RI is information about a channel rank. The channel of a rank means a maximum number of layers (or streams) in which different information may be transmitted through the same time-frequency resource. A rank value may be fed back in a longer cycle (i.e., less frequently) than a PMI and CQI because it is chiefly determined by long-term fading of a channel. In the case of transmit diversity, the RI is 1.

The PMI is information about a precoding matrix which is used in transmission from a transmitting end and is a value into which the spatial characteristic of a channel is incorporated. The term "precoding" means that a transmission layer is mapped to a transmission antenna, and a layer-antenna mapping relationship may be determined based on a precoding matrix. The PMI corresponds to the PMI of an eNB, which is preferred by UE based on a metric, such as a Signal-to-Interference plus Noise Ratio (SINR). In order to reduce feedback overhead of precoding information, a method of previously sharing, by a transmitting end and a receiving end, a codebook including several precoding matrices and feeding only an index indicative of a specific precoding matrix in the corresponding codebook back may be used.

The CQI is information indicative of the intensity of channel quality or channel. The CQI may be represented as a predetermined MCS combination. That is, a CQI index that is fed back is indicative of a corresponding modulation scheme and coding rate. In general, the CQI is a value into which a reception SINR which may be obtained when an eNB configures a space channel using a PMI is incorporated.

Table 3 illustrates an interpretation of a CQI index for a CQI report based on quadrature phase shift keying (QPSK), 16 quadrature amplitude modulation (QAM), 64 QAM, and 256 QAM.

TABLE 3

| CQI index | Modulation | Code rate × 1024 |
|---|---|---|
| 0 | Out of range | |
| 1 | QPSK | 78 |
| 2 | QPSK | 193 |
| 3 | QPSK | 449 |
| 4 | 16QAM | 378 |
| 5 | 16QAM | 490 |
| 6 | 16QAM | 616 |
| 7 | 64QAM | 466 |
| 8 | 64QAM | 567 |
| 9 | 64QAM | 666 |
| 10 | 64QAM | 772 |
| 11 | 64QAM | 873 |
| 12 | 256QAM | 711 |
| 13 | 256QAM | 797 |
| 14 | 256QAM | 885 |
| 15 | 256QAM | 948 |

In a system (e.g., LTE-A system) supporting an extended antenna configuration, to obtain additional multi-user diversity using a multi-user-MIMO (MU-MIMO) method is taken into consideration. In the MU-MIMO method, an interference channel is present between UEs multiplexed in an antenna region. Accordingly, it is necessary to prevent interference from occurring in another UE if an eNB performs downlink transmission using CSI fed back by one UE of multiple users. Accordingly, in order for an MU-MIMO operation to be correctly performed, CSI having higher accuracy compared to a single user-MIMO (SU-MIMO) method needs to be fed back.

A new CSI feedback method using improved CSI including an existing RI, PMI, and CQI may be used so that more accurate CSI can be measured and reported as described above. For example, precoding information fed back by a receiving end may be indicated by a combination of two PMIs. One (the first PMI) of the two PMIs has the attributes of a long-term and/or a wideband and may be called W1. The other (the second PMI) of the two PMIs has the attributes of a short-term and/or a subband and may be called W2. The final PMI may be determined by a combination (or function) of W1 and W2. For example, assuming that the final PMI is W, W=W1*W2 or W=W2*W1 may be defined.

In this case, the average characteristics of a channel in terms of the frequency and/or time are incorporated into W1. In other words, W1 may be defined as CSI into which the characteristics of a long-term channel in terms of time are incorporated, the characteristics of a wideband channel in terms of frequency are incorporated, or the characteristics of a long-term channel in terms of time and a wideband channel in terms of frequency are incorporated. In order to simply represent such characteristics of W1, W1 is called CSI of long-term-wideband attributes (or a long-term wideband PMI).

A channel characteristic that is instantaneous compared to W1 is incorporated into W2. In other words, W2 may be defined as CSI into which the characteristics of a short-term channel in terms of time are incorporated, the characteristics of a subband channel in terms of frequency are incorporated, or the characteristics of a short-term channel in terms of time and a subband channel in terms of frequency are incorporated. In order to simply represent such characteristics of W2, W2 is called CSI of a short-term subband attributes (or a short-term subband PMI).

In order for one final precoding matrix W to be determined based on information about 2 different attributes (e.g., W1 and W2) indicative of a channel state, it is necessary to configure a separate codebook including precoding matrices indicative of channel information about attributes (i.e., a first codebook for W1 and a second codebook for W2). The form of a codebook configured as described above may be called a hierarchical codebook. Furthermore, to determine a codebook to be finally used using the hierarchical codebook may be called hierarchical codebook transformation.

If such a codebook is used, channel feedback with higher accuracy compared to a case where a single codebook is used is made possible. Single cell MU-MIMO and/or multi-cell cooperation communication may be supported using channel feedback with higher accuracy as described above.

Such a CSI report method is divided into a periodic report that is periodically transmitted and an aperiodic report transmitted in response to a request from an eNB.

The aperiodic report is configured in UE according to a CSI request field of one or two bits included in an uplink scheduling grant (e.g., the DCI format 0 or 4) assigned to the UE by an eNB. When the information is received, each of pieces of UE may transfer CSI to the eNB through a PUSCH by taking into consideration its own transmission mode.

In the case of the periodic report, a CSI report cycle and an offset in the corresponding cycle are signaled to UE through higher layer signaling (e.g., RRC signaling) in a subframe unit. Each of UEs may transfer CSI to the eNB through a PUCCH by taking into consideration its own transmission mode based on a predetermined cycle.

If one or more serving cells have been configured in UE, the UE transmits CSI to only an activated serving cell. If UE has not been configured to send a PUSCH and a PUCCH simultaneously, the UE transmits a periodic CSI report on a PUCCH. In an aperiodic CQI/PMI report, an RI report is transmitted only if a CSI feedback type has been set to support an RI report. If a periodic report and an aperiodic report collide against each other within the same subframe, UE may perform only an aperiodic report.

First, an aperiodic CSI report using a PUSCH is described below.

Table 4 illustrates CQIs and PMI feedback types for a PUSCH CSI report mode.

TABLE 4

| | | PMI feedback type | | |
| --- | --- | --- | --- | --- |
| | | no PMI | single PMI | multi-PMI |
| PUSCH CQI feedback type | wideband CQI | | | mode 1-2 |
| | UE-selected (subband CQI) | mode 2-0 | | mode 2-2 |
| | higher layer-configured (subband CQI) | mode 3-0 | mode 3-1 | mode 3-2 |

In each transmission mode, the following report modes are supported on a PUSCH.

Transmission mode 1: mode 2-0, 3-0
Transmission mode 2: mode 2-0, 3-0
Transmission mode 3: mode 2-0, 3-0
Transmission mode 4: mode 1-2, 2-2, 3-1, 3-2
Transmission mode 5: mode 3-1
Transmission mode 6: mode 1-2, 2-2, 3-1, 3-2
Transmission mode 7: mode 2-0, 3-0
Transmission mode 8: If UE is configured to report a PMI/RI, mode 1-2, 2-2, 3-1; if UE is configured to not report a PMI/RI, mode 2-0, 3-0
Transmission mode 9: If UE is configured to report a PMI/RI and the number of CSI-RS ports exceeds 1, mode 1-2, 2-2, 3-1, 3-2; If UE is configured to not report a PMI/RI and the number of CSI-RS ports is 1, mode 2-0, 3-0
Transmission mode 10: If UE is configured to report a PMI/RI and the number of CSI-RS ports exceeds 1, mode 1-2, 2-2, 3-1, 3-2; If UE is configured to not report a PMI/RI and the number of CSI-RS ports is 1, mode 2-0, 3-0

An aperiodic CSI report mode is set by higher layer signaling (e.g., RRC signaling).

An RI is reported only in the transmission mode 3 or 4 and the transmission mode 8, 9 or 10 in which a PMI/RI report has been configured.

1) Wideband Feedback
Mode 1-2

In each subband, only transmission in a corresponding subband is assumed and a preferred precoding matrix is selected from a codebook subset.

UE reports the value of one wideband CQI for each codeword. In this case, the wideband CQI is calculated on the assumption that a precoding matrix selected in each subband corresponding to a transmission subband set S is used.

The UE may report a PMI selected in each subband set S or may report W1 (i.e., the first PMI) for the subband set S and W2 (i.e., the second PMI) for each subband set S.

The reported PMI and CQIs are calculated on condition of a reported RI or rank 1.

2) Higher Layer-Configured Subband Feedback
Mode 3-0

UE reports a calculated wideband CQI on the assumption of a transmission subband set S.

Furthermore, the UE reports a single subband CQI for each subband set S. The subband CQI is calculated on the assumption of only transmission in the corresponding subband.

Although an RI exceeds 1, both the wideband and subband CQIs indicate channel quality for the first codeword.

The reported CQI is calculated on condition of a reported RI or a rank 1.

Mode 3-1

One precoding matrix is selected from a codebook subset on the assumption of transmission in a subband set S.

UE reports a single subband CQI for each codeword in each subband set S. In this case, the subband CQI is calculated on the assumption of transmission in the corresponding subband and that one precoding matrix is used in all of subbands.

The UE reports a wideband CQI for each codeword. In this case, the wideband CQI is calculated on the assumption of transmission in the corresponding subband and that the one precoding matrix is used in all of subbands.

The UE may report a selected one PMI or may report W1 and W2 corresponding to the selected PMI.

The reported PMI and CQIs are calculated on condition of a reported RI or a rank 1.

Mode 3-2

A preferred precoding matrix is calculated from a codebook subset on the assumption of only transmission in a corresponding subband with respect to each subband.

UE reports the value of one wideband CQI for each codeword. In this case, the wideband CQI is calculated on the assumption of a transmission subband set S and that a precoding matrix selected in each subband is used.

The UE may report a selected one PMI with respect to each subband set S or may report W1 for all of subband sets S and W2 for each subband set S.

The UE reports a single subband CQI for each codeword in each subband set S. In this case, transmission in a single subband and the use of the precoding matrix selected in the corresponding subband are incorporated into the subband CQI.

The reported PMI and CQIs are calculated on condition of a reported RI or a rank 1.

A subband CQI for each codeword is differentially encoded compared to each wideband CQI using two bits.

That is, a subband differential CQI offset level is calculated as a difference between a subband CQI index and a wideband CQI index. That is, a subband differential CQI offset level=a subband CQI index−a wideband CQI index.

Table 5 illustrates a mapping relation between a subband differential CQI and an offset level.

TABLE 5

| Subband differential CQI | Offset level |
|---|---|
| 0 | 0 |
| 1 | 1 |
| 2 | ≥2 |
| 3 | ≤−1 |

Table 6 illustrates a relation between a subband (SB) size "k" and a system bandwidth in wideband feedback and higher layer-configured subband feedback.

TABLE 6

| System bandwidth $N_{RB}^{DL}$ | SB size (k) |
|---|---|
| 6-7 | NA |
| 8-10 | 4 |
| 11-26 | 4 |
| 27-63 | 6 |
| 64-110 | 8 |

3) UE-Selected Subband Feedback

Mode 2-0

UE selects a set including preferred M subbands of a size "k" within a subband set S. In this case, the values k and M are given in Table 8 according to a system bandwidth.

The UE also reports a single CQI into which transmission in the M selected subbands has been incorporated. Although an RI exceeds 1, a CQI is indicative of channel quality for the first codeword.

Furthermore, the UE reports the value of one wideband CQI. The wideband CQI is calculated on the assumption of transmission in the subband set S. Although the RI exceeds 1, a wideband CQI indicates channel quality for the first codeword.

The reported CQI is calculated on condition of the reported RI or a rank 1.

Mode 2-2

UE selects a set including preferred M subbands of a size "k" within a subband set S, and selects one precoding matrix that is preferred to be used for transmission in the M selected subbands from a codebook subset. In this case, the values k and M are given in Table 8 according to a system bandwidth.

The UE reports a single CQI for each codeword. Transmission in the selected M preferred subbands and the use of one precoding matrix selected in each M subband are incorporated into the CQI.

Furthermore, the UE may report a preferred selected one PMI in the M selected subbands. The UE may also report the selected one PMI for all of subband sets S or may report W1 for all of the subband sets S or may report W2 for all of the subband sets S and W2 for the M selected subbands.

The one precoding matrix is selected in a codebook subset on the assumption of transmission in the subband set S.

The UE reports a wideband CQI for each codeword. The wideband CQI is calculated on the assumption of transmission in the subband set S and that the one precoding matrix is used in all of subbands.

The reported PMI and CQIs are calculated on condition of a reported RI or rank 1.

In all of UE-selected subband feedback modes, UE reports the positions of M selected subbands using a combinatorial index "r" defined in Equation 15 below.

$$r = \sum_{i=0}^{M-1} \binom{N - s_i}{M - i}$$ [Equation 15]

In Equation 15, a subband set $\{s_i\}_{i=0}^{M-1}$ includes M subband indices. The subband index is equal to 1≤s-i≤N, s_i≤s_i+1.

In Equation 15, $$\binom{x}{y} = \begin{cases} \binom{x}{y} & x \geq y \\ 0 & x < y \end{cases}$$

is an extended binomial coefficient. Accordingly, a unique value is derived like $$r \in \left\{0, \ldots, \binom{N}{M} - 1\right\}.$$

A CQI for the M selected subbands with respect to each codeword is differentially encoded compared to each wideband CQI using two bits.

That is, the differential CQI offset level is calculated as a difference between the M selected subband CQI index and the wideband CQI index. That is, the differential CQI offset level=the M selected subband CQI index−the wideband CQI index Table 7 illustrates a mapping relation between a differential CQI and an offset level.

TABLE 7

| Differential CQI | Offset level |
|---|---|
| 0 | ≤1 |
| 1 | 2 |
| 2 | 3 |
| 3 | ≥4 |

Table 8 illustrates a relation between a SB size "k", the number M of subbands within a subband set S, and a system bandwidth in UE-selected subband feedback.

TABLE 8

| System bandwidth $N_{RB}^{DL}$ | SB size "k" (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

A periodic CSI report using a PUCCH is described below.

UE is configured to feed different CSI components (e.g., a CQI, a PMI, a PTI and/or an RI) back on a PUCCH using a report mode predetermined in Table 9 semi-statically and periodically through a higher layer. Multiple periodic CSI reports on a PUCCH corresponding to one or more CSI processes may be configured in UE in transmission mode 10 for each serving cell by a higher layer.

Table 9 illustrates CQIs and PMI feedback types for a PUCCH CSI report mode.

TABLE 9

| | | PMI feedback type | |
|---|---|---|---|
| | | No PMI | single PMI |
| PUCCH CQI feedback type | wideband CQI | Mode 1-0 | Mode 1-1 |
| | UE-selected (subband CQI) | Mode 2-0 | Mode 2-1 |

In each transmission mode, the following report modes are supported on a PUCCH.

Transmission mode 1: mode 1-0, 2-0
Transmission mode 2: mode 1-0, 2-0
Transmission mode 3: mode 1-0, 2-0
Transmission mode 4: mode 1-1, 2-1
Transmission mode 5: mode 1-1, 2-1
Transmission mode 6: mode 1-1, 2-1
Transmission mode 7: mode 1-0, 2-0
Transmission mode 8: If UE is configured to send a PMI/RI, mode 1-1, 2-1; If UE is configured to not report a PMI/RI, mode 1-0, 2-0
Transmission mode 9: If UE is configured to report a PMI/RI and the number of CSI-RS ports exceeds 1, mode 1-1, 2-1; If UE is configured to not report a PMI/RI and the number of CSI-RS ports is 1, mode 1-0, 2-0
Transmission mode 10: If UE is configured to report a PMI PMI/RI and the number of CSI-RS ports exceeds 1, mode 1-1, 2-1; If UE is configured to not report a PMI/RI and the number of CSI-RS ports is 1, mode 1-0, 2-0

In the case of UE in which transmission mode 1-9 has been configured, one periodic CSI report mode is configured in the UE by higher layer signaling (e.g., RRC signaling) in each serving cell. In the case of UE in which transmission mode 10 has been configured, one or more periodic CSI report modes are configured in the UE by higher layer signaling (e.g., RRC signaling) in each serving cell.

In a UE-selected subband CQI, in a specific subframe of a specific serving cell, a CQI report indicates channel quality for some part(s) of a bandwidth of a serving cell defined by a bandwidth part (BP). The BP is assigned an index without an increase of a bandwidth size in order of an increasing frequency from the lowest frequency.

The system bandwidth may be divided into N subbands with respect to each serving cell. One subband may include k RBs defined in Table 10 below. If the number of RBs of a full bandwidth is not a positive number times k, the last Nth subband may not include the k RBs. A BP(j) is frequency-contiguous and includes Nj subbands. BPs(J) may be determined over a subband set S or a system bandwidth. BPs(j) (0≤j≤J−1) are scanned in contiguous order according to an increasing frequency. In UE-selected subband feedback, one subband is selected from Nj subbands of a BP.

Table 10 illustrate4s a relation between SB sizes "k", BPs(J), and downlink system bandwidths in a periodic CSI report.

TABLE 10

| System bandwidth $N_{RB}^{DL}$ | SB size "k" (RBs) | Bandwidth parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

CQI/PMIs and RI report types below have different cycles and offsets and support a PUCCH CSI report mode.

Type 1 report supports CQI feedback for a UE-selected subband.
Type 1a report supports subband CQI and W2 feedback.
Type 2, Type 2b, and Type 2c reports support wideband CQI and PMI feedback.
Type 2a report supports wideband PMI feedback.
Type 3 report supports RI feedback.
Type 4 report supports a wideband CQI.
Type 5 report supports RI and wideband PMI feedback.
Type 6 report supports RI and PTI feedback.

A type in which only a wideband CQI/PMI is reported and a type in which both a wideband CQI/PMI and a subband CQI are reported are defined.

First, if a wideband CQI/PMI report has been configured, a transmitted subframe is determined as in Equation 16 below.

$$(10 \times n_f + \lfloor n_s/2 \rfloor - N_{OFFSET,CQI}) \bmod (N_{pd}) = 0 \quad \text{[Equation 16]}$$

In Equation 16, n_f denotes a system frame number, and n_s denotes a slot number within a radio frame.

In UE in which transmission mode 1-9 has been configured and each serving cell or in UE in which transmission mode 10 has been configured and each serving cell, in each CSI process, a cycle N_pd (in a subframe unit) and an offset N_OFFSET,CQI (in a subframe unit) for a CQI/PMI report are determined by a higher layer parameter.

If an RI report is configured, the report cycle of the RI report is a positive number times M_RI of N_pd, and a subframe in which the RI report is transmitted is determined as in Equation 17 below.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 17]}$$

In Equation 17, a relative offset N_OFFSET,RI and a cycle M_RI for an RI report are determined by a higher layer parameter.

If a wideband CQI/PMI and subband CQI report (or a subband CQI/W2 report for transmission mode 9 and 10) has been configured, a subframe is determined as in Equation 18 below.

$$(10 \times n_f + \lfloor n_s/2 \rfloor - N_{OFFSET,CQI}) \bmod N_{pd} = 0 \quad \text{[Equation 18]}$$

If a PTI is not transmitted or a PMI transmitted recently is 1, the cycle of a wideband CQI/wideband PMI report (or a wideband CQI/wideband W2 report for transmission mode 8, 9 and 10) is identical with H*N_pd. A transmitted subframe is determined as in Equation 19 below.

$$(10 \times n_f + \lfloor n_s/2 \rfloor - N_{OFFSET,CQI}) \bmod (H \cdot N_{pd}) = 0 \quad \text{[Equation 19]}$$

In Equation 19, H satisfies H=J*K+1, and J denotes the number of BPs.

A J*K a reporting instance between two contiguous wideband CQI/wideband PMI (or wideband CQI/wideband W2 for transmission mode 8, 9 and 10) reports may be used for a subband CQI (or subband CQI/W2 for transmission mode 9 and 10) report. The cycle of a BP increases from a BP 0 to a BP J−1. The parameter K is set by higher layer signaling (e.g., RRC signaling).

In contrast, if a PTI most recently transmitted is 0, the report cycle of a wideband W1 is equal to H'*N_pd, and a transmitted subframe is determined as in Equation 20 below.

$$(10 \times n_f + \lfloor n_s/2 \rfloor - N_{OFFSET,CQI}) \bmod (H' \cdot N_{pd}) = 0 \quad \text{[Equation 20]}$$

In Equation 20, H' is signaled by a higher layer.

The remaining a reporting instance between two contiguous wideband W1 reports is used for a wideband W2 along with a wideband CQI.

If an RI report is configured, the report cycle of the RI report is equal to times M_RI of a wideband CQI/PMI cycle H*N_pd. The RI is reported through a PUCCH cyclic shift resource, which is the same as a wideband CQI/PMI and subband CQI report. A subframe for an RI report is determined as in Equation 21 below.

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad \text{[Equation 21]}$$

1) Wideband Feedback

Mode 1-0

In a subframe in which an RI is reported (in the case of transmission mode 3), UE determines the RI on the assumption of transmission in a subband set S and reports a type 3 report including one RI.

In a subframe in which a CQI is reported, UE reports a type 4 report, including the value of one wideband CQI calculated on the assumption of transmission in a subband set S. Although an RI exceeds 1, a wideband CQI indicates channel quality for the first codeword. The CQI is calculated on condition of a periodic RI or a rank 1 that has been most recently reported.

Mode 1-1

In a subframe in which an RI is transmitted, UE may determine the RI on the assumption of transmission in a subband set S. In this case, the UE reports a type 3 report including one RI.

In a subframe in which an RI and W1 are reported, UE may determine an RI on the assumption of transmission in a subband set S. In this case, the UE reports a type 5 report including a joint-coded RI and W1 (a set of precoding matrixes selected from a codebook subset on the assumption of transmission in the subband set S).

In a subframe in which a CQI/PMI is reported, one precoding matrix is selected from a codebook subset on the assumption of transmission in a subband set S. UE reports a type 2 report including one wideband CQI and a selected one PMI (a wideband PMI). In this case, the value of the one wideband CQI is calculated on the assumption of transmission in the subband set S and the use of one precoding matrix in all of the subbands. If an RI exceeds 1, a wideband spatial differential CQI of additional 3 bits may be included in the type 2 report as in the example of Table 11.

In a subframe in which a wideband CQI/W2 is reported, a codebook subset is selected from one precoding matrix on the assumption of transmission in a subband set S. UE reports a type 2b report including the value of one wideband CQI and a wideband W2. The value of the one wideband CQI is calculated on the assumption of transmission in the subband set S and the use of one precoding matrix in all of the subbands. If an RI exceeds 1, a wideband spatial differential CQI of additional 3 bits may be included in the type 2b report as in the example of Table 11.

In a subframe in which a wideband CQI/W1/W2 is reported, one precoding matrix is selected from a codebook subset on the assumption of transmission in a subband set S. UE reports a type 2c report including the value of one wideband CQI, a wideband W1, and a wideband W2. The value of the one wideband CQI is calculated on the assumption of transmission in the subband set S and the use of one precoding matrix in all of the subbands. If an RI exceeds 1, a wideband spatial differential CQI of additional 3 bits may be included in the type 2c report as in the example of Table 11.

2) UE-Selected Subband Feedback

Mode 2-0

In a subframe in which an RI is reported, UE determines the RI on the assumption of transmission in a subband set S. The UE reports a type 3 report including one RI.

In a subframe in which a wideband CQI is reported, UE may report a type 4 report, including the value of one wideband CQI calculated on the assumption of transmission in a subband set S, in each contiguous report opportunity. Although an RI exceeds 1, the wideband CQI indicates channel quality for the first codeword. The CQI may be calculated on condition of a periodic RI reported most recently or a rank 1.

In a subframe in which a CQI for a selected subband is reported, UE selects a preferred subband within a set of Nj subbands within each J BP. The UE reports a type 1 report including a single CQI. Transmission in a subband selected from a determined BP along with an L bit label of the corresponding preferred subband is incorporated into the single CQI. The type 1 report for each BP may be alternately reported in each contiguous report opportunity. Although an RI exceeds 1, channel quality for the first codeword is incorporated into the CQI. The selection of the preferred subband and the CQI may be calculated on condition of a periodic R1 that has been reported most recently or a rank 1.

Mode 2-1

In a subframe in which an RI is reported, UE may report a type 3 report including a single RI. Furthermore, the UE may report a type 6 report including a PRI for a CSI process and one RI.

In a subframe in which a wideband CQI/PMI is reported, one precoding matrix is selected from a codebook subset on the assumption of transmission in a subband set S. UE may report a type 2 report including a wideband CQI and a selected one PMI. The wideband CQI may be calculated on the assumption of transmission in the subband set S and the use of one precoding matrix in all of the subbands. If an RI exceeds 1, a wideband spatial differential CQI of additional 3 bits may be included in the type 2 report as in the example of Table 11 below.

In a subframe in which a wideband W1 is reported, a set of precoding matrixes corresponding to the wideband W1 is selected from a codebook subset on the assumption of transmission in a subband set S. UE reports a type 2a report, including the wideband W1 corresponding to the set of selected precoding matrixes, on each contiguous report opportunity.

In a subframe in which a wideband CQI/W2 is reported, one precoding matrix is selected from a codebook subset on the assumption of transmission in a subband set S. UE reports a type 2b report, including the wideband CQI and the wideband W2 corresponding to the selected one precoding matrix, in each contiguous report opportunity. If an RI exceeds 1, a wideband spatial differential CQI of additional 3 bits may be included in the type 2b report as in the example of Table 11 below.

In a subframe in which a CQI for a selected subband is reported, UE selects a preferred subband from a set of Nj subbands within each J BP. The UE reports a type 1 report, including a CQI for each BP, in each contiguous report opportunity. Transmission only in the selected subband of a determined BP along with the bit label of a corresponding preferred subband L is incorporated into a CQI for a codeword 0. If an RI exceeds 1, a subband spatial differential CQI for the offset level of a codeword 1 of additional 3 bits may be included in the type 1 report. The offset level of the codeword 1 is determined based on a difference between a subband CQI index for the codeword 0 and a subband CQI index for the codeword 1. That is, the codeword 1 offset level=the subband CQI index for the codeword 0−the subband CQI index for the codeword 1. The subband spatial differential CQI is calculated on the assumption of transmission in a selected subband within an applicable BP and the use of one precoding matrix that has been reported most recently in all of the subbands. A mapping relation between the subband spatial differential CQI of 3 bits and an offset level is listed in Table 11 below.

In a subframe in which a wideband CQI/W2 is reported, one precoding matrix is selected from codebook subset on the assumption of transmission in a subband set S. UE reports a type 2b report, including a wideband CQI and a wideband W2, in each contiguous report opportunity. The wideband CQI is calculated on the assumption of transmission in the subband set S and the use of a selected one precoding matrix in all of the subbands. If an RI exceeds 1, a wideband spatial differential CQI of additional 3 bits may be included in the type 2b report as in the example of Table 11 below.

In a subframe in which a subband CQI/W2 for a selected subband is reported, UE selects a preferred subband within a set of Nj subbands within each J BP. The UE reports a type 1a report, including a CQI for each BP and W2, in each contiguous report opportunity. Transmission in a selected subband of a determined BP along with the bit label of a corresponding preferred subband L is incorporated into a CQI for a codeword 0. W2 of the precoding matrix is selected as a preferred precoding matrix from a codebook subset on the assumption of transmission only in a selected subband within a BS that has been selected in a higher layer and that is applicable. If an RI exceeds 1, a subband spatial differential CQI for the offset level of a codeword 1 of additional 3 bits may be included in the type 1a report. The offset level of the codeword 1 is determined as a difference between a subband CQI index for the codeword 0 and a subband CQI index for the codeword 1. That is, the codeword 1 offset level=the subband CQI index for the codeword 0−the subband CQI index for the codeword 1. The subband spatial differential CQI is calculated on the assumption of transmission in a selected subband within an applicable BP, a selected W2, and the use of a precoding matrix corresponding to W1 that has been reported most recently. A mapping relation between a subband spatial differential CQI of 3 bits and an offset level is listed in Table 11.

Table 11 shows a mapping relation between a spatial differential CQI and an offset level.

TABLE 11

| Spatial differential CQI | Offset level |
| --- | --- |
| 0 | 0 |
| 1 | 1 |
| 2 | 2 |
| 3 | ≥3 |
| 4 | ≤−4 |
| 5 | −3 |
| 6 | −2 |
| 7 | −1 |

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

If not, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 12 below. The PDSCH corresponding to the PDCCH(s) is scrambling-initialized by the SI-RNTI.

Table 12 illustrates a PDCCH and PDSCH configured by an SI-RNTI.

TABLE 12

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 13 below. The PDSCH corresponding to the PDCCH(s) is scrambling-initialized by the P-RNTI.

Table 13 illustrates a PDCCH and PDSCH configured by a P-RNTI.

TABLE 13

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 14 below. The PDSCH corresponding to the PDCCH(s) is scrambling-initialized by the RA-RNTI.

Table 14 illustrates a PDCCH and PDSCH configured by an RA-RNTI.

TABLE 14

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 10 transmission modes, including a mode 1 to a mode 10.

In the case of the frame structure type 1,
UE does not receive a PDSCH RB transmitted in the antenna port 5 even in any subframe in which the number of OFDM symbols for a PDCCH having a common CP is 4.

If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.

UE does not receive a PDSCH RB transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

In the case of the frame structure type 2,
UE does not receive a PDSCH RB transmitted in the antenna port 5 even in any subframe in which the number of OFDM symbols for a PDCCH having a common CP is 4.

If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.

If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.

If a common CP is configured, UE does not receive a PDSCH in the antenna port 5 in which distributed VRB resource allocation has been assigned within a special subframe in an uplink-downlink configuration #1 or #6.

UE does not receive a PDSCH transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 15 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 15 illustrates a PDCCH and PDSCH configured by a C-RNTI.

TABLE 15

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | large delay CDD or transmit diversity |
| Mode 4 | DCI format 1A | common and UE-specific by a C-RNTI | transmit diversity |
|  | DCI format 2 | UE-specific by a C-RNTI | closed-loop spatial multiplexing or transmit diversity |
| Mode 5 | DCI format 1A | common and UE-specific by a C-RNTI | transmit diversity |
|  | DCI format 1D | UE-specific by a C-RNTI | multi-user MIMO |
| Mode 6 | DCI format 1A | common and UE-specific by a C-RNTI | transmit diversity |
|  | DCI format 1B | UE-specific by a C-RNTI | closed-loop spatial multiplexing using a single transport layer |

TABLE 15-continued

| TRANSMISSION MODE | DCI FORMAT | SEARCH SPACE | METHOD FOR SENDING PDSCH CORRESPONDING TO PDCCH |
|---|---|---|---|
| Mode 7 | DCI format 1A | common and UE-specific by a C-RNTI | If the number of PBCH antenna ports is 1, a single antenna port, a port 0 is used, and if not, transmit diversity |
|  | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
|  | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
|  | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 16 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 16 illustrates a PDCCH and PDSCH configured by an SPS C-RNTI.

TABLE 16

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |

TABLE 16-continued

| TRANS-MISSION MODE | DCI FORMAT | SEARCH SPACE | METHOD FOR SENDING PDSCH CORRESPONDING TO PDCCH |
|---|---|---|---|
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | transmit diversity |
| Mode 4 | DCI format 1A | common and UE-specific by a C-RNTI | transmit diversity |
|  | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
|  | DCI format 1 | UE-specific by a C-RNTI | a single antenna port, a port 5 |
| Mode 8 | DCI format 1A | common and UE-specific by a C-RNTI | a single antenna port, a port 7 |
|  | DCI format 2B | UE-specific by a C-RNTI | a single antenna port, a port 7 or 8 |
| Mode 9 | DCI format 1A | common and UE-specific by a C-RNTI | a single antenna port, a port 7 |
|  | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 17. The PDSCH corresponding to the PDCCH(s) is scrambling-initialized by the temporary C-RNTI.

Table 17 illustrates a PDCCH and a PDSCH configured by a temporary C-RNTI.

TABLE 17

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

UE Procedure for PUSCH Transmission

UE is semi-statically configured through higher layer signaling so that it performs PUSCH transmission signaled through a PDCCH according to any one of two types of uplink transmission modes 1 and 2 defined in Table 18 below. If the UE is configured by a higher layer so that it decodes a PDCCH with CRC scrambled by a C-RNTI, the UE decodes the PDCCH according to a combination defined in Table 18 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

When UE is configured as the transmission mode 2 and receives a DCI format 0 uplink scheduling grant, the UE assumes that PUSCH transmission is related to a transport block 1 and a transport block 2 is disabled.

Table 18 illustrates a PDCCH and a PUSCH configured by a C-RNTI.

TABLE 18

| TRANS-MISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |
|  | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 19 below.

Table 19 illustrates a PDCCH set as a PDCCH order for starting a random access procedure.

TABLE 19

| DCI FORMAT | SEARCH SPACE |
|---|---|
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 20 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 20 illustrates a PDCCH and a PUSCH configured by an SPS C-RNTI.

TABLE 20

| TRANS-MISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 21 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 21 illustrates a PDCCH configured by a temporary C-RNTI.

TABLE 21

| DCI FORMAT | SEARCH SPACE |
|---|---|
| DCI format 0 | common |

If UE is configured by a higher layer so that it decodes a PDCCH with CRC scrambled by a TPC-PUCCH-RNTI, the UE decodes the PDCCH according to a combination defined in Table 13 below. In Table 21, indication "3/3A" means that UE receives the DCI format 3 or a DCI format depending on a configuration.

Table 22 illustrates a PDCCH configured by a TPC-PUCCH-RNTI.

TABLE 22

| DCI FORMAT | SEARCH SPACE |
|---|---|
| DCI formats 3/3A | common |

If UE is configured by a higher layer so that it decodes a PDCCH with CRC scrambled by a TPC-PUSCH-RNTI, the UE decodes the PDCCH according to a combination defined in Table 23 below. In Table 23, indication "3/3A" includes that UE receives the DCI format 3 or a DCI format depending on a configuration.

Table 23 illustrates a PDCCH configured by a TPC-PUSCH-RNTI.

TABLE 23

| DCI FORMAT | SEARCH SPACE |
|---|---|
| DCI formats 3/3A | common |

Cross-Carrier Scheduling and E-PDCCH Scheduling

In the 3GPP LTE Rel-10 system, a cross-CC scheduling operation is defined as follows in a situation in which a plurality of component carriers (CCs)=(serving)cells) has been aggregated. One CC (i.e., scheduled CC) may be previously configured so that DL/UL scheduling is performed by only a specific one CC (i.e., scheduling CC) (i.e., so that a DL/UL grant PDCCH for a corresponding scheduled CC is received). Furthermore, the corresponding scheduling CC may basically perform DL/UL scheduling therefor. In other words, a search space (SS) for a PDCCH that schedules a scheduling/scheduled CC within a cross-CC scheduling relation may be fully present in the control channel region of the scheduling CC.

In the LTE system, an FDD DL carrier or TDD DL subframes, as described above, use the first n OFDM symbols of a subframe to send a PDCCH, a PHICH, and a PCFICH, that is, physical channels for sending various types of control information, and use the remaining OFDM symbols for PDSCH transmission. In this case, the number of symbols used for control channel transmission in each subframe is transferred to UE dynamically through a physical channel, such as a PCFICH or in a semi-static manner through RRC signaling. In this case, characteristically, an "n" value may be set to 1 symbol to a maximum of 4 symbols depending on subframe characteristics and system characteristics (e.g., FDD/TDD or a system bandwidth).

In an existing LTE system, a PDCCH, that is, a physical channel for DL/UL scheduling and the transmission of various types of control information, has a limit because it is transmitted through restricted OFDM symbols.

Accordingly, an enhanced PDCCH (i.e., an E-PDCCH) that is more freely multiplexed into a PDSCH using an FDM/TDM method may be introduced instead of a control channel transmitted through an OFDM symbol separated from a PDSCH like a PDCCH.

FIG. 15 is a diagram illustrating a PDCCH and E-PDCCHs in a wireless communication system to which an embodiment of the present invention may be applied.

Referring to FIG. 15, a legacy PDCCH (i.e., L-PDCCH) is transmitted in the first n OFDM symbols of a subframe, and E-PDCCHs are multiplexed into a PDSCH using an FDM/TDM method and transmitted.

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE can perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE can perform the detection/reception, channel estimation, and channel state report of a downlink reference signal through a QC/QCL assumption between antenna ports.

CSI-RS Configuration

A CSI-RS is transmitted through 1, 2, 4 or 8 antenna ports. In this case, antenna ports used are p=15, p=15, 16, p=15, . . . , 18, p=15, . . . , 22. The CSI-RS may be defined with respect to a subcarrier interval $\Delta f = 15$ kHz only.

In a subframe configured for CSI-RS transmission, a CSI-RS sequence is mapped to a complex-valued modulation symbol $a\_k,l^\wedge(p)$ used as a reference symbol on each antenna port p as in Equation 22.

$$a_{k,l}^{(p)} = w_{l''} \cdot r_{l,n_s}(m') \quad \text{[Equation 22]}$$

$$k = k' + 12m +$$

$$\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +$$

$$\begin{cases}
l'' , & CSI \text{ reference signal configurations } 0\text{-}19 \\
& \text{normal cyclic prefix} \\
2l'' & CSI \text{ reference signal configurations } 20\text{-}31 \\
& \text{normal cyclic prefix} \\
l'' & CSI \text{ reference signal configurations } 0\text{-}27 \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 22, (k',l') (in this case, k' is a subcarrier index within a resource block and l' is an OFDM symbol index within a slot). A condition "n_s" is determined according to a CSI-RS configuration, such as Table 24 or Table 25 below.

Table 24 illustrates mapping of (k',l') from a CSI-RS configuration in a common CP.

TABLE 24

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

Table 25 illustrates the mapping of (k',l') from a CSI-RS configuration in an extended CP.

TABLE 25

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |

TABLE 25-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 26 | (1, 1) | 1 | | | | |
| 27 | (0, 1) | 1 | | | | |

Referring to Table 24 and Table 25, in the transmission of a CSI-RS, in a multi-cell environment including a heterogeneous network (HetNet) environment, in order to reduce inter-cell interference (ICI), a maximum of 32 (in the case of a common CP) or a maximum of 28 (in the case of an extended CP) different configurations are defined.

The CSI-RS configuration is different depending on the number of antenna ports within a cell and a CP, and a neighbor cell may have a maximum of different configurations. Furthermore, the CSI-RS configuration may be divided into a case where it is applied to both an FDD frame and a TDD frame and a case where it is applied to only a TDD frame depending on the structure of a frame.

(k',l') and n_s are determined depending on a CSI-RS configuration based on Tables 24 and 25. If (k',l') and n_s are applied to Equation 22, a time-frequency resource in which a CSI-RS antenna port is used in CSI-RS transmission is determined.

FIG. 16 is a diagram illustrating a CSI-RS configuration in a wireless communication system to which an embodiment of the present invention may be applied.

More specifically, FIG. 16 illustrates a CSI-RS configuration (i.e., a in the case of a common CP) according to Equation 22 and Table 24.

FIG. 16(a) shows 20 CSI-RS configurations which may be used in CSI-RS transmission through one or two CSI-RS antenna ports. FIG. 16(b) shows 10 CSI-RS configurations which may be used by 4 CSI-RS antenna ports. FIG. 16(c) shows 5 CSI-RS configurations which may be used in CSI-RS transmission through 8 CSI-RS antenna ports.

As described above, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration of 20 CSI-RS configurations shown in FIG. 16(a).

Likewise, when 4 antenna ports are configured for CSI-RS transmission with respect to a specific cell, the CSI-RS is transmitted on radio resources according to a configured CSI-RS configuration of 10 CSI-RS configurations shown in FIG. 16(b). Furthermore, when 8 antenna ports are configured for CSI-RS transmission with respect to a specific cell, the CSI-RS is transmitted on radio resources according to a configured CSI-RS configuration of 5 CSI-RS configurations shown in FIG. 16(c).

A CSI-RS for each antenna port every 2 antenna ports (i.e., {15, 16}, {17, 18}, {19,20}, and {21,22}) is subjected to the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and then mapped to the same radio resources. The complex symbol of a CSI-RS for the antenna port 15 is multiplied by [1, 1] and mapped to the same radio resources. The complex symbol for a CSI-RS for the antenna port 16 is multiplied by [1 −1] and mapped to the same radio resources. The same is true of the antenna ports {17, 18}, {19,20}, and {21,22}.

UE may detect a CSI-RS for a specific antenna port by multiply the CSI-RS by code by which a transmitted symbol is multiplied. That is, in order to detect the CSI-RS for the antenna port 15, the UE multiplies the CSI-RS by multiplied code [1 1]. In order to detect the CSI-RS for the antenna port 16, the UE multiplies the CSI-RS by multiplied code [1 −1].

Referring to FIGS. 16(a) to 16(c), if CSI-RS configurations correspond to the same CSI-RS configuration index, radio resources according to a CSI-RS configuration having a larger number of antenna ports include radio resources according to a CSI-RS configuration having a smaller number of CSI-RS antenna ports. For example, in the case of a CSI-RS configuration 0, radio resources for the number of 8 antenna ports include both radio resources for the number of four antenna ports and radio resources for the number of one or two antenna ports.

A plurality of CSI-RS configurations may be used in one cell. Only a 0 or 1 CSI-RS configuration may be used in a non-zero power (NZP) CSI-RS, and only 0 or several CSI-RS configurations may be used in a zero power (ZP) CSI-RS.

In a ZeroPower (ZP) CSI-RS that is a bitmap of 16 bits configured by a higher layer, UE assumes zero transmission power in REs (e.g., excluding an RE redundant with an RE that assumes a NZP CSI-RS configured by a higher layer) corresponding to the 4 CSI-RS columns in Table 24 and Table 25 for each bit set to 1. The most significant bit (MSB) corresponds to the lowest CSI-RS configuration index, and a next bit within the bitmap sequentially corresponds to a next CSI-RS configuration index.

The CSI-RS is transmitted only in a downlink slot satisfying the condition of "n_s mod 2" and a subframe satisfying a CSI-RS subframe configuration in Table 24 and Table 25.

In the case of the frame structure type 2 (TDD), a CSI-RS is not transmitted in a special subframe, a synchronous signal (SS), a subframe that collides against the transmission of a PBCH or SystemInformationBlockType1 (SIB 1) message, or a subframe configured to send a paging message.

Furthermore, an RE in which a CSI-RS for any antenna port belonging to the antenna port set S (S={15}, S={15, 16}, S={17, 18}, S={19,20} or S={21,22}) is transmitted is not used to send a PDSCH or a CSI-RS for another antenna port.

Data throughput is reduced as CSI-RS overhead increases because time-frequency resource used to send a CSI-RS cannot be used for data transmission. Accordingly, a CSI-RS is not configured to be transmitted for each subframe, but is configured to be transmitted in each specific transmission cycle corresponding to a plurality of subframe by taking into consideration such a reduction of the data through. In this case, overhead for CSI-RS transmission can be reduced compared to a case where a CSI-RS is transmitted in each subframe.

A subframe cycle for CSI-RS transmission (hereinafter referred to as a "CSI transmission cycle") T_CSI-RS and a subframe offset Δ_CSI-RS are listed in Table 26 below.

Table 26 illustrates CSI-RS subframe configurations.

TABLE 26

| CSI-RS-<br>SubframeConfig $I_{CSI-RS}$ | CSI-RS periodicity<br>$T_{CSI-RS}$<br>(subframes) | CSI-RS subframe<br>offset $\Delta_{CSI-RS}$<br>(subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 26, a CSI-RS transmission cycle T_CSI-RS and a subframe offset Δ_CSI-RS are determined by a CSI-RS subframe configuration I_CSI-RS.

In Table 26, the CSI-RS subframe configuration may be configured by higher layer signaling (e.g., RRC signaling). The CSI-RS subframe configuration may be separately determined with respect to a NZP CSI-RS and a ZP CSI-RS.

A subframe including a CSI-RS satisfies Equation 23 below.

$$(10n_f + \lfloor n_s/2 \rfloor - \Delta_{CSI-RS}) \mod T_{CSI-RS} = 0 \quad \text{[Equation 23]}$$

In Equation 23, T_CSI-RS denotes a CSI-RS transmission cycle, Δ_CSI-RS denotes a subframe offset value, n_f denotes a system frame number, and n_s denotes a slot number.

If transmission mode 9 has been configured in UE with respect to a serving cell, one CSI-RS resource configuration may be configured in the UE. If transmission mode 10 has been configured in UE with respect to a serving cell, one or more CSI-RS resource configuration(s) may be configured in the UE.

Parameters for each CSI-RS resource configuration are set through higher layer signaling as below.

If transmission mode 10 has been configured, a CSI-RS resource configuration ID
The number of CSI-RS ports
A CSI-RS configuration (refer to Table 24 and Table 25)
A CSI-RS subframe configuration I_CSI-RS (refer to Table 26)
If transmission mode 9 has been configured, transmission power P_C for CSI feedback
If transmission mode 10 has been configured, transmission power P_C for CSI feedback is set with respect to each CSI process. If CSI subframe sets C_CSI, 0 and C_CSI, 1 are configured by a higher layer with respect to a CSI process, P_C is set for each CSI subframe set of the CSI process.
A pseudo-random sequence generator parameter n_ID
If transmission mode 10 has been configured, a higher layer parameter "qcl-the CRS-Info-r11" including QCL scrambling ID (qcl-ScramblingIdentity-r11) for QuasiCo-Located (QCL) type B UE assumption, a CRS port count (crs-PortsCount-r11), and a multicast-broadcast single-frequency network (MBSFN) subframe configuration list (mbsfn-SubframeConfigList-r11) parameter.

If a CSI feedback value derived by UE has a value within a range of [−8, 15] dB, $P_c$ is assumed to be a ratio of a PDSCH EPRE to a CSI-RS EPRE. In this case, the PDSCH EPRE corresponds to a symbol in which a ratio of the PDSCH EPRE to the CRS EPRE is ρ_A.

A CSI-RS and a PMCH are not configured together in the same subframe of a serving cell.

In the frame structure type 2, if 4 CRS antenna ports have been configured, a CSI-RS configuration index belonging to a [20-31] set (refer to Table 24) in the case of a common CP or a [16-27] set (refer to Table 25) in the case of an extended CP is not configured in UE.

UE may assume that the CSI-RS antenna port of a CSI-RS resource configuration has a QCL relation with respect to delay spread, Doppler spread, a Doppler shift, an average gain, and average delay.

UE in which transmission mode 10 and QCL type B have been configured may assume that the antenna ports 0-3 corresponding to a CSI-RS resource configuration and the antenna ports 15-22 corresponding to the CSI-RS resource configuration have a QCL relation with respect to Doppler spread and a Doppler shift.

If transmission mode 10 has been configured in UE, one or more channel-state information-interference measurement (CSI-IM) resource configurations may be configured in the UE with respect to a serving cell.

The following parameters for each CSI-IM resource configuration may be configured through higher layer signaling.
a ZP CSI-RS configuration (refer to Table 24 and Table 25)
a ZP CSI RS subframe configuration I_CSI-RS (refer to Table 26)

A CSI-IM resource configuration is the same as any one of configured ZP CSI-RS resource configurations.

A CSI-IM resource and a PMCH are not configured in the same subframe of a serving cell at the same time.

If transmission mode 1-9 has been configured in UE, one ZP CSI-RS resource configuration may be configured in the UE with respect to a serving cell. If transmission mode 10 has been configured in UE, one or more ZP CSI-RS resource configurations may be configured in the UE with respect to a serving cell.

The following parameters for a ZP CSI-RS resource configuration may be configured through higher layer signaling.
a ZP CSI-RS configuration list (refer to Table 24 and Table 25)
a ZP CSI-RS subframe configuration I_CSI-RS (refer to Table 26)

A ZP CSI-RS and a PMCH are not configured in the same subframe of a serving cell at the same time.

Method for Transmitting and Receiving Channel State Information in a Larger Bandwidth An embodiment of the present invention proposes a method for measuring and/or reporting, by UE, channel state information (CSI) in a situation in which a signal is transmitted and received through a carrier in an unlicensed band in which the exclusive use of a specific system is not guaranteed and/or in a wireless communication environment in which a bandwidth is larger than that of a common cellular system.

In this specification, a time period in which an eNB and UE have occupied/secured a corresponding carrier resource in order to send and receive a signal through a carrier of an unlicensed band/spectrum is collectively referred to as a reserved resource period (RRP).

In this case, the RRP may be defined to be essentially limited to a single contiguous time period or may be defined as a set form of a plurality of contiguous time periods. For example, the RRP may include a symbol, a slot, a subframe or a radio frame unit.

The name of a base station described in this specification is used as a comprehensive term, including a remote radio head (RRH), an eNB, a transmission point (TP), a reception point (RP), and a relay.

Hereinafter, a proposal method based on 3GPP LTE/LTE-A systems is described below, for convenience of description. However, the range of a system to which the proposal method is applied may be extended to other systems (e.g., UTRA) in addition to the 3GPP LTE/LTE-A systems.

In 3GPP, there has been proposed a service of an unlicensed band/spectrum, that is, license assisted access (LAA), as one of schemes for satisfying the explosive increase of mobile communication data traffic as mobile communication data traffic is explosively increased. LAA means a technology for aggregating an LTE license band and an unlicensed band/spectrum into one using a carrier aggregation (CA). LLA is described below with reference to FIG. 17.

FIG. 17 is a diagram illustrating a carrier aggregation in an unlicensed band/spectrum according to an embodiment of the present invention.

An eNB may send a signal to UE or the UE may send a signal to an eNB in a situation in which a component carrier (CC) (or cell) of a licensed band and a CC (or cell) of an unlicensed band have been subjected to a carrier aggregation as in FIG. 17.

Hereinafter, for convenience of description, a licensed band is referred to as an "LTE-A band", and an unlicensed band/spectrum is referred to as an "LTE-U band" compared to an LTA-A band.

Hereinafter, in the description of an embodiment of the present invention, for convenience of description of a method proposed in an embodiment of the present invention, there is assumed a situation in which UE has been configured to perform wireless communication through two CCs in a licensed band and an unlicensed band/spectrum. In this case, for example, a carrier of a licensed band may be construed as being a primary component carrier (PCC or PCell), and a carrier of an unlicensed band/spectrum may be construed as being a secondary component carrier (SCC or SCell).

However, methods proposed in embodiments of the present invention may be extended and applied to a situation in which a plurality of licensed bands and a plurality of unlicensed bands are used as a carrier aggregation scheme. Furthermore, the methods may also be extended and applied to a case where only unlicensed bands/spectrums are subjected to a carrier aggregation or only licensed bands are subjected to a carrier aggregation and the transmission and reception of a signal are performed between an eNB and UE. Furthermore, the methods proposed in the embodiments of the present invention may also be extended and applied to systems having other characteristics in addition to 3GPP LTE systems.

An LTE-U band means a band in which the independent use of a specific system is not guaranteed. Accordingly, in order for an eNB and UE to perform communication in an LTE-U band, the corresponding band needs to be occupied/secured during a specific time period (i.e., an RRP) through a contention with other communication systems (e.g., Wi-Fi (i.e., an 802.11 system)) not related to LTE because the corresponding band is an unlicensed spectrum.

In order to occupy such an RRP, several methods may be present. As a representative method, there may be a method in which an eNB and/or UE sends a specific reservation signal or continues to send an RS and a data signal so that a signal of a specific power level or more continues to be transmitted during an RRP in order for other communication systems, such as a Wi-Fi system, to recognize that a corresponding wireless channel has been busy.

In this case, the eNB may solely perform clear channel assessment (CCA) in an LTE-U band and notify the UE of a occupied RRP. For example, if an operation of an uplink/downlink band for an FDD system is supported in an LTE-U band, only an eNB may perform CCA in an LTE-U band and occupy an RRP.

In contrast, UE may autonomously occupy resources of an LTE-U band by performing CCA in addition to an eNB. For example, if a TDD operation is supported in an LTE-U band or an operation of an uplink band for an FDD system is supported in an LTE-U band, UE may occupy an RRP in the LTE-U band by performing CCA in addition to an eNB.

If the eNB has previously determined an RRP time period to be occupied in the LTE-U band, it may notify the UE of the RRP time period in advance so that the UE can maintain a communication transmission/reception link during the corresponding indicated RRP.

A method for notifying, by an eNB, UE of corresponding RRP time period information may include a method for explicitly transferring corresponding RRP time period information through another CC (e.g., an LTE-A band) connected in a carrier aggregation form.

For example, the eNB may transmit the start and end points of the RRP to the UE (e.g., a slot number, a subframe index, etc.), or transmit the start point of the RRP (e.g., a slot number, a subframe index, etc.) and the length of the RRP (e.g., the number of slots or subframes) to the UE.

However, in case of the method of transmitting the RRP information in the form of an explicit indication, there is a restriction that the amount of predictable data traffic should be pre-calculated, and the state of the wireless communication channel link in the LTE-U band should be possible to predict in some degree. That is, if the interference environment changes significantly during the RRP and the degree of the changes is not easy to predict, the RRP may continue to be extended beyond the initial expectation, and further signaling may continue. If an error occurs in the signaling exchange, there is a problem such as not being guaranteed.

Therefore, there is another method of not using the explicit RRP indication method but a method of allowing the UE to detect the reference signal of the corresponding unlicensed band in the form of blind detection and to recognize the detected interval as the RRP FIG. 18 is a diagram illustrating channelization in an unlicensed band to which an embodiment of the present invention may be applied.

FIG. 18 illustrates IEEE 802.11ac channelization of the United States.

As in the example of FIG. 18, it may be seen that an unlicensed band of a corresponding 5 GHz band can be used as an unlicensed band having a very large bandwidth. That is, in general, an unlicensed band has a bandwidth much larger than a system bandwidth (e.g., 10 or 20 MHz) of a typical cellular system (e.g., LTE/LTE-A), and may require CSI feedback enhancement for an operation, such as an operation for receiving a report on CSI feedback from UE with respect to the bandwidth wide as described above and applying the CSI feedback to a specific closed-loop transmission method.

Accordingly, an embodiment of the present invention proposes a method for measuring, by UE, a channel and/or reporting CSI in a serving cell having a larger bandwidth than that of an unlicensed band in which the exclusive use of a specific system is not guaranteed and/or that of a common cellular system.

In an embodiment of the present invention, UE may measure a channel state in a serving cell (or (components) carrier) having a larger bandwidth than that of an unlicensed band or a common cellular system, and may send information about the measured channel state in a serving cell having a larger bandwidth than a serving cell of a licensed band, an unlicensed band or a common cellular system.

It is assumed that the same environment as that of the unlicensed band is given, for convenience of description, in describing an embodiment of the present invention. In this case, technologies proposed in the embodiment of the present invention may be applied in common licensed bands and/or a specific bandwidth supporting a larger bandwidth than that of a typical cellular communication environment.

Hereinafter, in describing an embodiment of the present invention, if a serving cell (i.e., a downlink band in the case of FDD or a downlink subframe in the case of TDD) and/or a serving cell (i.e., an uplink band in the case of FDD or an uplink subframe in the case of TDD) in which UE sends channel state information, that is, an object whose channel state is measured by the UE is configured in an unlicensed band, it is assumed that an RRP has been configured in the corresponding serving cell and the UE has already recognized the RRP.

FIG. 19 is a diagram illustrating a method for sending channel state information according to an embodiment of the present invention.

Referring to FIG. 19, UE determines channel state information (CSI) for a serving cell at step S1901.

In this case, the serving cell may be a cell configured in an unlicensed band or a licensed band.

The CSI may include a CQI, a PMI, a PTI and/or an RI.

This is described in more detail. The RI may be determined by the number of useful transmission layers.

The CQI may be calculated based on a reference signal (e.g., a CRS or CSI-RS) received from an eNB. The value of the CQI may be determined to be a CQI index mapped to a modulation and code rate. In this case, the CQI may be calculated based on an RI and/or PMI that has been previously reported on the assumption of transmission in a wideband and subband.

The PMI is determined to be an index indicative of a precoding matrix preferred by the UE from a codebook subset (configured by a higher layer). In this case, the precoding matrix may be calculated based on an RI that has been previously reported on the assumption of transmission in a wideband and subband.

The PTI may be included in an RI report, and the contents of a CSI report that follows according to the value of the PTI may be changed or not changed. For example, when the PTI is set to 0, a wideband W1 and a wideband CQI/W2 may be subsequently reported. When the PTI is set to 1, a wideband CQI/W2 and a subband CQI/W2 may be subsequently reported.

In this case, a method for determining, by UE, CSI according to an embodiment of the present invention is described later. Furthermore, in an embodiment of the present invention, the description related to a UE's determination of CSI and CSI feedback described in order to send the determined CSI although it is not separately described may be merged in an embodiment of the present invention.

Furthermore, the UE sends the determined CSI on a serving cell to the eNB at step S1902.

In this case, if the serving cell has been configured in an unlicensed band, the UE may send the CSI to the eNB within the RRP of the serving cell.

The CSI may be transmitted periodically and aperiodically. More specifically, in a periodic CSI report, a reporting instance for each CSI may be determined. A method for determining and/or sending CSI may be different depending on whether a reporting instance is present within an RRP. This is described in detail later.

Periodic CSI Report (P-CSI) Report

If UE operates to or is configured to directly perform a periodic CSI (P-CSI) report) in an unlicensed band as in the aforementioned LTE-U band, there may be a problem in that a reporting instance(s), such as a corresponding periodically configured RI/PMI/CQI, is not always included in an RRP.

This is described in more detail. In a P-CSI feedback configuration in a typical licensed band, the cycle/offset parameter (e.g., M_RI, N_OFFSET,RI) of an RI report and a parameter (e.g., N_pd, J, K, N_OFFSET,CQI) related to the cycle/offset of a PMI/CQI report are provided to UE through higher layer signaling (e.g., RRC signaling). The UE periodically sends a CSI report in uplink through a PUCCH (e.g., the PUCCH format 2) at each RI/PMI/CQI reporting instance (e.g., reporting subframe) determined through corresponding parameters.

If such an operation is not an environment in which a transport channel is not always occupied/guaranteed as in an LTE-U band, however, there may be a restriction condition in which a specific CSI reporting instance is not an uplink transmission-possible state (e.g., the state in which a channel is not busy). That is, the reporting instance of each CSI has to belong to an RRP determined in a serving cell of an LTE-U band.

Hereinafter, in the aforementioned periodic CSI report, it is assumed that parameters used to calculate a condition equation (e.g., refer to Equation 16 to Equation 21) for determining a specific reporting instance using a cycle/offset parameter, such as the frame number "n_f" and the slot number "n_s", may be calculated based on the timing instance of a specific reference signal.

For example, the same parameters "n_f" and "n_s" may be applied to a serving cell of an LTE-U band depending on timing of a PCell or the parameters "n_f" and "n_s" applied to a serving cell of an LTE-U band in a form in which a specific offset(s) has been separately applied to a corresponding parameter value of a PCell may be calculated.

In any form, it is assumed that UE is uniquely aware of the index "n_s" of a slot unit and the index "n_f" of a radio frame unit that are contiguously defined regardless of the presence of an RRP in a corresponding LTE-U band.

In such a case, for example, if a specific RI reporting instance does not belong to an RRP (e.g., if a channel is occupied by another device) and thus transmission drops, there may be a problem in that what report contents transmitted at a subsequent specific PMI/CQI reporting instance is determined based on which RI value becomes ambiguous.

In an embodiment of the present invention, a subsequent PMI/CQI report may be performed based on an RI that has been always successfully reported most recently. In this case, the RI includes an RI transmitted in a previous non-contiguous separate RRP.

In this case, if the latest reported RI is an RI reported very long time ago by such an operation, to report a PMI/CQI based on such an RI may be meaningless feedback transmission due to severe CSI aging. This may result in the waste of uplink resources.

In this case, a relation between an RI reporting instance and a subsequent PMI/CQI reporting instance has been described as an example. An embodiment of the present invention may be identically applied to a relation between other specific long-term CSI (e.g., a W1 PMI) reporting instance and a subsequently relatively-short-term CSI (e.g., a W2 PMI, CQI) reporting instance. For example, a W2 and/or CQI may be determined based on a W1 that has been successfully reported most recently.

In order to prevent the waste of uplink transmission resources and CSI aging, such as those described above, the following several additional restriction operations may be defined or configured in UE. This is described below with reference to FIG. 20.

FIG. 20 is a diagram illustrating a method for sending CSI according to an embodiment of the present invention.

(1) In an embodiment of the present invention, UE drops corresponding CSI report at a reporting instance (e.g., a PMI/CQI) for another CSI prior to an RI reporting instance that first appears within an RRP.

In contrast, UE sends corresponding CSI report at a reporting instance for another CSI (e.g., a PMI/CQI) after an RI reporting instance that first appears within an RRP. In this case, another CSI after the RI reporting instance that first appears within the RRP may be determined based on the first (initial) RI within the RRP and on the assumption of a preset rank.

Accordingly, there is an advantage in that the waste of uplink report resources and CSI aging can be prevented because CSI is prevented from being determined on the assumption of the latest RI in a previous RRP(s).

In the example of FIG. 20(a), UE drops corresponding CSI report at CSI reporting instances 2011 and 2012 other than an RI prior to the first RI reporting instance 2013 within an RRP.

In contrast, the UE determines corresponding CSI based on the first RI within the RRP at CSI reporting instances 2014 and 2015 other than an RI after the first RI reporting instance 2013, and sends the determined CSI to an eNB.

(2) Alternatively, in another embodiment of the present invention, a specific "out of range (OOR)" message not corresponding CSI is transmitted at a reporting instance for another CSI (e.g., a PMI/CQI) prior to an RI reporting instance that first appears within an RRP. In this case, the OOR message may be defined or configured in the form of a message shorter than a CSI report payload size (e.g., 11 bits in the case of the PUCCH format 2) which may be transmitted in a typical corresponding instance. Furthermore, separate message contents for providing information for other purposes along with a corresponding OOR may be defined and configured to be transmitted at a corresponding instance.

In contrast, UE sends corresponding CSI report at a reporting instance for another CSI (e.g., a PMI/CQI) after an RI reporting instance that first appears within the RRP. In this case, another CSI after the RI reporting instance that first appears within the RRP may be determined based on the first RI within the RRP and on the assumption of a preconfigured rank.

If UE drops corresponding CSI at a CSI reporting instance as in the aforementioned embodiment (1), ambiguity may increase. That is, an eNB may not precisely determine whether the UE has dropped corresponding CSI at a CSI reporting instance or whether the UE has transmitted CSI, but the eNB has not detected the corresponding CSI. Accordingly, it may be more stable if the UE sends an OOR.

In the example of FIG. 20(a), the UE sends the OOR message at the CSI reporting instances 2011 and 2012 other than an RI prior to the first RI reporting instance 2013 within the RRP.

In contrast, the UE determines corresponding CSI based on the first RI within the RRP at the CSI reporting instances 2014 and 2015 other than an RI after the first RI reporting instance 2013, and sends the determined CSI to the eNB.

(3) Alternatively, in yet another embodiment of the present invention, CSI determined based on a preset RI may be transmitted at a reporting instance for another CSI (e.g., a PMI/CQI) prior to an RI reporting instance that first appears within an RRP.

In this case, the RI may be set as a previously fixed value, such as a rank 1, for example. Furthermore, the RI may be set as a previously fixed value depending on transmission mode configured in UE.

In the example of FIG. 20(a), the UE sends CSI determined based on a preset RI at the CSI reporting instances 2011 and 2012 other than an RI prior to the first RI reporting instance 2013 within the RRP.

In contrast, the UE determines corresponding CSI based on the first RI within the RRP at the CSI reporting instances 2014 and 2015 other than an RI after the first RI reporting instance 2013, and sends the determined CSI to the eNB.

This may also be identically applied to a relation between another specific long-term CSI (e.g., a W1 PMI) reporting instance and a relatively short-term CSI (e.g., a W2 PMI and a CQI) reporting instance. For example, at the reporting instance of short-term CSI prior to the first long-term CSI within an RRP, CSI determined based on preset long-term CSI may be reported.

(4) Alternatively, in yet another embodiment of the present invention, the latest RI in a previous RRP may be assumed. In this case, it is assumed that the latest RI is valid only when corresponding latest RI is a value transmitted within a specific time window.

That is, when UE sends corresponding CSI at a CSI reporting instance other than an RI prior to the first RI reporting instance within an RRP, if an RI transmitted within a specific time window is present, the UE determines another CSI based on the corresponding RI and sends the corresponding CSI to an eNB at the reporting instance of the corresponding CSI within the RRP.

Such a specific time window value (e.g., a value of a ms unit) may be previously defined or configured in UE. In this case, the time window may be calculated based on the reporting instance of another CSI in addition to an RI or may be calculated based on an instance at which an RRP is started.

If the latest RI out of such a specific time window period value is assumed, such an RI may be considered to be invalid. That is, if an RI transmitted within a specific time window is not present, corresponding CSI report may be defined to be dropped or a specific message of an OOR form may be defined to be transmitted or CSI determined on the assumption of a preset RI may be defined to be transmitted or configured in UE according to the operations of the embodiments (1) to (3) at a reporting instance for another CSI prior to an RI reporting instance that first appears within an RRP.

Furthermore, the UE sends a corresponding CSI report at a reporting instance for another CSI (e.g., a PMI/CQI) after an RI reporting instance that first appears within the RRP. In this case, another CSI after the RI reporting instance that first appears within the RRP may be determined based on the first RI within the RRP and on the assumption of a preset rank.

In the example of FIG. 20(b), UE determines whether the reporting instance 2021 of an RI transmitted most recently at CSI reporting instances 2022 and 2023 other than an RI prior to a first RI reporting instance 2024 within an RRP corresponds to the time window.

If the reporting instance 2021 of the latest transmitted RI is determined to be within the time window, the UE determines CSI other than an RI prior to the first RI reporting instance 2024 within the RRP based on a corresponding RI, and sends the CSI at corresponding CSI reporting instances 2022 and 2023.

In contrast, if the reporting instance 2021 of the latest transmitted RI is determined to be out of the time window, the UE drops a corresponding CSI report at the CSI reporting instances 2022 and 2023 other than an RI prior to the first RI reporting instance 2024 within the RRP or sends an OOR message.

The UE determines corresponding CSI based on the first RI within the RRP at CSI reporting instances 2025 and 2026 other than an RI after the first RI reporting instance 2024, and sends the CSI to an eNB.

(5) Alternatively, in yet another embodiment of the present invention, CSI is determined on the assumption of the latest RI in a previous RRP at another CSI reporting instance prior to the first RI reporting instance within an RRP. Furthermore, at a short-term CSI (e.g., a W2 PMI or CQI) reporting instance prior to the first long-term CSI (e.g., a W1 PMI) reporting instance within an RRP, corresponding CSI report may be dropped, a specific message of an OOR form may be transmitted, or CSI determined on the assumption of a present RI may be transmitted according to the operations of the embodiments (1) to (3).

In contrast, UE sends a corresponding CSI report based on the first RI within an RRP and on the assumption of a preset rank at a reporting instance for another CSI (e.g., including long-term CSI or short-term CSI) after an RI reporting instance that first appears within the RRP. Likewise, UE may determine short-term CSI after a long-term CSI reporting instance that first appears within an RRP based on the first long-term CSI within the RRP.

In the example of FIG. 20(c), UE may determine an RI that has been transmitted most recently at CSI reporting instances 2032, 2033, and 2034 other than an RI prior to the first RI reporting instance 2035 within an RRP.

In this case, the UE may drop a corresponding CSI report, may send a specific message of an OOR form, or may send CSI determined on the assumption of preset long-term CSI according to the operations of the embodiments (1) to (3) at the short-term CSI reporting instances 2032 and 2033 prior to the first long-term CSI reporting instance 2034 within the RRP.

That is, if the previous operation (1) or (2) is applied, only corresponding long-term CSI is determined based on the latest reported RI at the first long-term CSI reporting instance 2034 within the RRP and transmitted.

Furthermore, the UE determines corresponding CSI based on the first RI within the RRP at a CSI reporting instance other than an RI after the first RI reporting instance 2034 within the RRP, and sends the determined CSI to an eNB.

In another embodiment of the present invention, feedback contents corresponding to a PUSCH feedback mode (i.e., an aperiodic CSI report) (e.g., in the example of Table 4, mode 1-2, 2-0, 2-2, 3-0, 3-1 and/or 3-2) may be configured to be reported at a specific cycle without separate aperiodic triggering.

That is, in a situation in which a corresponding wireless channel, such as an RRP, has been determined to be used even without the transmission of a separate uplink grant DCI (e.g., DCI 0, 4 or a random access uplink grant), report contents according to a specific PUSCH feedback mode may be transmitted.

If CSI is transmitted through a PUSCH, CSI feedback contents can be transmitted without the intervention of a payload size. Accordingly, there is an advantage in that an RI, PMI, and CQI can be transmitted through a single reporting instance.

For such an operation, a cycle and/or an offset may be set by higher layer signaling (e.g., RRC signaling).

For example, a cycle parameter may be set as a separate parameter (e.g., N_PUSCH) in a form similar to a cycle parameter, such as M_RI or N_pd. Furthermore, an offset parameter may be set as a separate parameter (e.g., N_OFFSET,PUSCH) in a form similar to an offset parameter, such as N_OFFSET,RI, N_OFFSET,CQI. A reporting instance for a CSI periodic report through a PUSCH may be determined based on the cycle parameter and offset parameter in accordance with Equation 24 below along with parameters, such as the radio frame number "n_f" and the slot number "n_s", according to such a parameter.

$$10*n_f+\text{floor}(n_s/2)-N_{OFFSET,PUSCH}) \bmod (N_{PUSCH})=0 \quad \text{[Equation 24]}$$

That is, in an instance (e.g., subframe) satisfying Equation 24, CSI feedback content may be previously defined in UE so that it is transmitted through a PUSCH.

Furthermore, the position of a specific uplink resource for sending corresponding feedback contents may also be configured. For example, a specific set of one or more RBs of an RB unit may be configured in a frequency domain.

There is an advantage in that a PMI of a subband unit can be additionally transmitted periodically because report contents according to a specific PUSCH feedback mode are transmitted even without an UL grant through such an operation.

As a result, the UE periodically sends the CSI report content (based on PUSCH feedback) regarding the cycle/offset parameter and the position of UL transmission resources separately configured in the UE. The UE starts the transmission if a corresponding reporting instance is included in a specific RRP and drops the transmission if the corresponding reporting instance is not included in the specific RRP. In this case, the eNB may notify the UE of the RRP through explicit signaling as described above or the UE may directly check the RRP through blind detection.

The periodic CSI report using a PUSCH may be identically applied to a serving cell configured in a licensed band in addition to a serving cell configured in an unlicensed band.

A CSI reporting type (i.e., a PUCCH periodic CSI report and a PUSCH periodic CSI report) may be determined for each serving cell. If a plurality of serving cells is configured in a piece of UE in an unlicensed band, only a PUCCH periodic CSI reporting type may be configured in a specific serving cell of an unlicensed band, and only a PUSCH periodic CSI reporting type may be configured in other serving cells.

Furthermore, both the PUCCH periodic CSI reporting type and the PUSCH periodic CSI reporting type may be configured in one serving cell. In this case, a PUSCH periodic CSI report may have priority over a PUCCH periodic report. For example, if the reporting instance of a PUSCH periodic CSI report overlaps the reporting instance of a PUCCH periodic CSI report, UE may perform only the PUSCH periodic CSI report and drop the PUCCH periodic CSI report.

Likewise, a PUSCH aperiodic CSI report may have priority over a PUSCH periodic report. If a PUSCH aperiodic CSI report is triggered in response to an UL grant from an eNB in a cell in which the PUSCH periodic CSI reporting type has been configured, in an instance in which the reporting instance of a PUSCH periodic CSI report overlaps that of a PUSCH aperiodic CSI report, UE may perform only the PUSCH aperiodic CSI report and drop the PUSCH periodic CSI report.

Subband CSI Report

As in the example of FIG. 18, more specifically, the available bandwidth of an unlicensed band may be very wide.

A system bandwidth versus subband (SB) size taken into consideration in current LTE/LTE-A systems is basically defined in Table 6 above.

Furthermore, for a PUCCH periodic CSI report, the system bandwidth versus SB size is defined as in Table 10 above. Referring to Table 10, for example, if the value $N\_RB^{\hat{}}DL$ is 64-110, an SB size may be 8 RBs.

Alternatively, if a PUSCH CQI feedback type in PUSCH aperiodic CSI report modes is UE-selected (i.e., an SB CQI) (i.e., mode 2-0 or mode 2-2), an SB size having smaller granularity is used as in Table 8 different from Table 6 and Table 10.

As may be seen from such a table, in current LTE/LTE-A systems, a maximum of 110 RBs, that is, an SB size corresponding to a system bandwidth of 20 MHz, is defined to be an SB size. An SB report feedback mode for such an SB unit is supported.

Accordingly, if the support of a larger system bandwidth (e.g., several tens of ~several hundreds of MHz), such as an LTE-U band, is taken into consideration, according to one scheme for a CSI report, a corresponding LTE-U band may be divided into a plurality of component carriers (CCs) and an existing CSI report operation may be applied to each of the CCs.

However, in a situation in which a plurality of CCs is taken into consideration as described above, several problems, such as that a CSI-related UE processing time or the number of CCs capable of simultaneous CSI reports are limited, may occur.

Accordingly, in an embodiment of the present invention, a case where the system bandwidth of a single CC is configured to be a larger system bandwidth is taken into consideration. That is, if the bandwidth of a single CC is further increased, the amount of CSI reports of UE may be increased because a total number of RBs (or SBs) or an SB size may be increased in the system bandwidth of the CC. Accordingly, an embodiment of the present invention proposes a method for a UE SB CSI report, which may be taken into consideration in a band in which the system bandwidth of a single CC is set to be larger (e.g., 20 MHz or more) than the system bandwidth of a CC defined in LTE/LTE-A.

An embodiment of the present invention is not limited to a specific bandwidth number value and is not limited to an unlicensed band only. That is, an embodiment of the present invention may be identically applied to a common licensed band and/or a specific bandwidth supporting a bandwidth larger than that of a typical cellular communication environment.

FIG. 21 is a diagram illustrating a method for sending CSI according to an embodiment of the present invention.

Referring to FIG. 21, UE determines a first CSI value for a serving cell at step S2101. In this case, the first CSI value may correspond to a WB CSI value or an SB group CSI value, for example.

The UE determines the differential CSI value of an SB corresponding to an offset level between the first CSI value (or index) determined at step S2001 and the CSI value (or index) of an SB compared to the first CSI value (or index) at step S2102.

Furthermore, step S2102 may be subdivided, and the UE may determine the differential CSI value of the SB compared to a second CSI value. For example, if the first CSI value corresponds to a wideband CSI value, the second CSI value may correspond to a CSI value for an SB group, and the differential CSI value of the SB may be determined compared to the second CSI value.

The UE reports the first CSI value and the differential CSI value of the SB, determined at step S2101 and step S2102, to an eNB at step S2103.

The first CSI value and the differential CSI value of the SB may be transmitted to the eNB periodically or aperiodically through a periodic PUCCH and/or PUSCH.

If an SB CSI report has been configured, step S2101 and step S2102 illustrate step S1901 of FIG. 19 in detail. Step S2103 may correspond to step S1902 of FIG. 19.

Hereinafter, the CQI of the pieces of CSI is described as an example for convenience of description, but the present invention is not limited thereto.

Option 1) Addition of the State of an OOR

The state of an OOR (or changes a specific offset level into an OOR) may be added to a delta CQI (i.e., a differential CQI) for each SB. For example, in the table in which the mapping relation between the differential CQIs and the offset levels is defined, an offset level mapped to the last state (i.e., the greatest differential CQI) may be replaced with an OOR.

In a bandwidth (e.g., an SB) in which very great interference is locally generated in an LTE-U band, an eNB may exclude scheduling. Accordingly, in order for an eNB to exclude the scheduling of a corresponding band (e.g., an SB), an OOR is defined as the state corresponding to a delta CQI for each SB. The OOR means indication information indicating that scheduling in a corresponding SB is inappropriate. That is, when UE reports an SB delta CQI corresponding to an OOR to an eNB, the eNB may exclude a corresponding SB when performing scheduling in a corresponding CC for the corresponding UE.

Hereinafter, an SB CQI report mode in which an SB delta CQI is fed back is described in more detail as an example.

For example, in the case of an SB CSI report in a current LTE system, in a higher layer-configured SB report mode, such as a PUSCH CSI report mode 3-1, an SB CQI is calculated in the following form.

An SB CQI for each codeword is differentially encoded in relation to each wideband (WB) CQI using two bits.

That is, a subband differential CQI offset level is calculated as a difference between an SB CQI index and a WB CQI index. That is, the subband differential CQI offset level=the subband CQI index-the wideband CQI index.

A mapping relation between a subband differential CQI and an offset level is illustrated in Table 5 above. Furthermore, a supported SB size "k" is given as in Table 6 above.

Referring to Table 5, for example, when UE reports a subband differential CQI "3" to an eNB, the eNB may reduce a WB CQI index by 1 or more because the subband differential CQI "3" corresponds to "≤−1", and thus incorporate the reduced WB CQI index into a scheduling decision. Furthermore, for example, when UE reports a subband differential CQI "1" to an eNB, the eNB may increase a WB CQI index by 1 because the subband differential CQI "1" corresponds to "1", and thus incorporate the reduced WB CQI index into a scheduling decision.

That is, basically, each SB differential CQI is determined by a specific offset level on the basis of a WB CQI index reported together.

In a case where strong interference (e.g., interference with another system, such as a Wi-Fi signal) locally has an influence on a specific bandwidth (e.g., an SB unit), such as an LTE-U band, if UE reports a CQI "3" for a corresponding SB to an eNB, when the eNB interprets the CQI as "≤−1" as in a conventional technology, for example, the eNB may incorporate the application of the lowest index CQI into a scheduling decision because it means that a WB CQI index reported together with the CQI is reduced by an index of a 1 column or more.

In this case, in an unlicensed band, data may not be transmitted and received in a specific subband because channel quality is too bad in the specific subband (due to interference from another wireless communication system device that sends and receives a signal in a neighbor bandwidth). In this case, if UE tries to provide SB CSI feedback meaning that "scheduling through a corresponding SB is inappropriate because interference is very strong in the corresponding SB", a method for clearly transferring such feedback has not been defined.

Accordingly, an embodiment of the present invention proposes a method for interpreting a specific state (i.e., an offset level) again and applying it so that the state can be applied to a separate CC such as a larger bandwidth system, such as an LTE-U band.

For example, in Table 5, an offset level "≤−1" corresponding to the last value "3" of the SB differential CQIs may be replaced with the value of an "OOR" form.

Table 27 illustrates a mapping relation between a subband differential CQI and an offset level according to an embodiment of the present invention.

TABLE 27

| Subband differential CQI | Offset level |
|---|---|
| 0 | 0 |
| 1 | 1 |
| 2 | ≥2 |
| 3 | OOR |

Referring to Table 27, when UE reports an SB differential CQI of "3" to an eNB based on a table defined as in Table 27, the eNB may exclude a corresponding SB from a scheduling object when scheduling the UE in a corresponding CC.

Furthermore, Table 28 below may be defined so that SB CSI feedback having a meaning that a WB CQI is reduced can be provided.

Table 28 illustrates a mapping relation between a subband differential CQI and an offset level according to an embodiment of the present invention.

TABLE 28

| Subband differential CQI | Offset level |
|---|---|
| 0 | ≤0 |
| 1 | 1 |
| 2 | ≥2 |
| 3 | OOR |

As in Table 28, an offset level mapped to the SB differential CQI "3" may be changed into an OOR, and instead an offset level mapped to the SB differential CQI "0" may be additionally modified into "≤0." That is, the existing part in which "≤−1" can be reported may be modified into "≤0" so that it has a meaning of "0 or less", and an OOR state may be newly added.

Referring to Table 28, if UE reports an SB differential CQI of "0" to an eNB based on a table defined as in Table 28, when scheduling the UE in a corresponding CC, the eNB may identically maintain a WB CQI index or may reduce an existing WB CQI index to the existing WB CQI or less and incorporate the reduced WB COI index into the scheduling decision of the UE.

Furthermore, if UE reports an SB differential CQI of "3" to an eNB based on a table defined as in Table 28, when scheduling the UE in a corresponding CC, the eNB may exclude a corresponding SB from a scheduling object.

As a result, a newly defined table, such as Table 27 and/or Table 28, may be said to be an appropriate SB CQI feedback method if locally very strong interference as in an LTE-U band is monitored in a specific SB unit.

Furthermore, a newly defined table, such as Table 27 and/or Table 28, and an existing Table 5 may be optionally applied. That is, an optional application between an existing table, such as Table 5, and a newly defined table that may be interpreted again, such as Table 27 and/or Table 28, may be controlled by specific higher layer signaling (e.g., RRC signaling or MAC control element (CE) signaling) or dynamic signaling (e.g., DCI) from an eNB. For example, an eNB may send information for specifying a table (i.e., information indicative of a mapping relation between a subband differential CQI and an offset level) to UE. In response to the instruction of corresponding signaling from the eNB, the UE may perform an SB CQI report by optionally applying a corresponding table.

Furthermore, for example, in the case of another SB CSI report in a current LTE system, in a UE-selected SB report mode, such as a PUSCH CSI report mode 2-2, an SB CQI is calculated in the following form.

The CQI of M selected SBs for each codeword is differentially encoded compared to each WB CQI using two bits.

That is, a differential CQI offset level is calculated as a difference between an M selected SB CQI index and a WB CQI index. That is, the differential CQI offset level=the M selected subband CQI index−the wideband CQI index.

A mapping relation between the differential CQI and the offset level has been illustrated in Table 7 above.

Furthermore, a supported SB size "k" and an M value are given in Table 8 above.

That is, basically, each SB CQI is determined by a specific offset level on the basis of a WB CQI index reported together.

In a case where strong interference (e.g., interference with another system, such as a Wi-Fi signal) locally has an influence on a specific bandwidth (e.g., an SB unit), such as an LTE-U band, if UE reports a CQI "0" for a corresponding SB to an eNB, when the eNB interprets the CQI as "≤1" as in a conventional technology, the eNB may incorporate the application of the lowest index CQI into a scheduling decision because it means that a WB CQI index reported together with the CQI is increased by 1 one column or identically maintained or reduced to the CQI or less.

Data may not be transmitted and received in a corresponding band due to locally strong interference in a specific bandwidth (e.g., an SB unit), such as an LTE-U band, as described above.

In this case, if UE provides corresponding CQI feedback meaning that "scheduling through a corresponding SB is inappropriate because interference is very strong in the corresponding SB", there is no method for clearly transferring such feedback.

Accordingly, in an embodiment of the present invention, a specific state of Table 7 may be interpreted again and applied so that it can be applied to a separate CC, such as a larger bandwidth system, as in the LTE-U band.

For example, an offset level "≤1" corresponding to the differential CQI "0" of Table 7 may be replaced with a value of an "OOR" form.

Table 29 illustrates a mapping relation between a differential CQI and an offset level according to an embodiment of the present invention.

TABLE 29

| Differential CQI | Offset level |
| --- | --- |
| 0 | OOR |
| 1 | 2 |
| 2 | 3 |
| 3 | ≥4 |

Referring to Table 29, when UE reports an SB differential CQI of "0" to an eNB based on a table defined as in Table 29, the eNB may exclude a corresponding SB (i.e., M selected SBs) from a scheduling object when scheduling the UE in a corresponding CC.

Furthermore, Table 30 below may be defined so that SB CSI feedback having a meaning that a WB CQI is reduced can also be provided.

Table 30 illustrates a mapping relation between a differential CQI and an offset level according to an embodiment of the present invention.

TABLE 30

| Differential CQI | Offset level |
| --- | --- |
| 0 | OOR |
| 1 | ≤2 |
| 2 | 3 |
| 3 | ≥4 |

As in Table 30, an offset level mapped to the differential CQI "0" may be changed into an OOR, and instead an offset level mapped to the differential CQI "1" may be additionally modified into "≤2." That is, the existing part in which "≤1" can be reported may be modified into "≤2" so that it has a meaning of "2 or less", and a new OOR state may be newly added.

Referring to Table 30, if UE reports an SB differential CQI of "0" to an eNB based on a table defined as in Table 30, when scheduling the UE in a corresponding CC, the eNB may exclude a corresponding SB (i.e., M selected SBs) from a scheduling object.

Furthermore, when UE reports an SB differential CQI of "1" to an eNB based on a table defined as in Table 30, when scheduling the UE in a corresponding CC, the eNB may increase a WB CQI index by 2 or 1, may identically maintain a WB CQI index or lower or may reduce a WB CQI index to the WB CQI index or less, and may apply a corresponding WB CQI index to the scheduling decision of the UE.

As a result, a newly defined, such as Table 29 and/or Table 30, may be said to be an appropriate CQI feedback method if locally very strong interference as in an LTE-U band is monitored in a specific SB unit.

Furthermore, a newly defined table, such as Table 29 and/or Table 30, and an existing Table 7 may be optionally applied. That is, an optional application between an existing table, such as Table 7, and a newly defined table that may be interpreted again, such as Table 29 and/or Table 30, may be controlled by specific higher layer signaling (e.g., RRC signaling or MAC control element (CE) signaling) or dynamic signaling (e.g., DCI) from an eNB. For example, an eNB may send information for specifying a table (i.e., information indicative of a mapping relation between a subband differential CQI and an offset level) to UE. In response to the indication of corresponding signaling from the eNB, the UE may perform an SB CQI report by optionally applying a corresponding table.

An operation for changing an existing table related to an SB CQI report into a new table or adding a new table has been described by taking Table 27 to Table 30 as an example, but this is only an example. Accordingly, another embodiment of the present invention may include an example in which an offset level value corresponding to a different differential CQI in Table 27 to Table 30 is changed into a different value.

Furthermore, in yet another embodiment of the present invention, as the "OOR" state illustrated in Table 27 to Table 30 is added, the existing two-bit table may be extended to a 3-bit table. In this case, all of modification examples in which additional offset level values are allocated to the remaining state after the "OOR" state is added in the table extended to 3 bits may be construed as being included in an embodiment of the present invention.

Furthermore, the two PUSCH-based SB CQI report modes have been described as examples, but it is evident that the above contents may be generalized, extended, and applied to other SB CQI report modes. For example, in the PUCCH periodic CSI report, in Table 11 defining a mapping relation between spatial differential CQIs used in the wideband feedback mode 1-1 or the UE-selected subband feedback mode 2-1 and an offset level, an "OOR" state (e.g., an offset level corresponding to a spatial differential CQI "4") may be added (or a specific offset level may be changed into an OOR). Furthermore, an offset level corresponding to a spatial differential CQI "5" may also be changed into "≤−3" so that SB CSI feedback meaning that a WB CQI is reduced to −4 or loss can also be provided in addition to the addition.

Option 2) Representative CQI for Each SB Group and Differential CQI Report within Each SB Group In another embodiment regarding an SB report, assuming that a current specific SB unit is an X physical resource block(s) (PRB) (e.g., X=8 in a 110 RB system in Table 6), a specific "SB group" unit is defined by grouping an N number (e.g., N=3) of such SB units. For example, if N=3, a total of 3×RBs are included in one SB group. Furthermore, UE reports a representative CQI for each SB group, and reports a differential CQI based on the SB group representative CQI for each SB within a corresponding SB group.

For example, the representative CQI for each SB group may correspond to a CQI for a specific SB within a corresponding SB group, the median of CQIs for SBs belonging to the corresponding SB group or an average value of the CQIs for the SBs belonging to the corresponding SB group.

FIG. 22 is a diagram illustrating a method for reporting a subband CQI according to an embodiment of the present invention.

FIG. 22 illustrates an example in which each SB group includes 3 SBs (i.e., N=3), such as {0, 1, 2}, {3, 4, 5}, . . . , {k, k+1, k+2}, {k+3, k+4, k+5}, . . . .

In the SB CSI report mode, UE reports a CQI for each SB group (or per-SB-group CQI). The per-SB-group CQI includes a differential CQI for an SB between an SB group representative CQI and a group representative CQI for each SB belonging to a corresponding SB group.

FIG. 22 shows an example in which UE reports a CQI for a specific SB (e.g., a CQI for an SB k+1) within a corresponding SB group as an SB group representative CQI Q_K with respect to an SB group #K. In this case, the UE may report only a differential CQI for an SB k and a differential CQI for an SB k+2 to an eNB as a differential CQI for each SB.

In contrast, if UE reports the median or average value of CQIs for each SB as an SB group representative CQI Q_K, the UE may report all of the SB group representative CQI Q_K versus a differential CQI for an SB k, a differential CQI for an SB k+1, and a differential CQI for an SB k+2 to an eNB.

As in the example of FIG. 22, when UE reports a CQI for a specific SB within a corresponding SB group as a representative CQI for each SB group (e.g., Q_K for an SB group #K), it relates to a specific SB (e.g., a (k+1)$^{th}$ SB). Accordingly, Q_K, that is, a corresponding CQI, may be independently calculated based on a specific CQI table (e.g., a 4-bit CQI table, such as Table 3 defined in LTE/LTE-A).

Alternatively, if a representative CQI for each SB group is calculated based on the median or an average value based on a CQI for each SB belonging to a corresponding SB group, the CQI for each SB may be independently calculated based on a specific CQI table (e.g., a 4-bit CQI table, such as Table 3 defined in LTE/LTE-A), and a corresponding SB group representative CQI may be calculated as the median or average value of a CQI for each SB.

Next, CQIs for SBs belonging to a corresponding SB group may be defined so that it reports a differential CQI corresponding to a specific offset level value based on an SB group representative CQI Q_K on the basis of a table (e.g., Table 5, Table 7 or Table 11) defining a mapping relation between each differential CQI and each offset level, or may be configured in UE.

Furthermore, when UE reports a differential CQI compared to the representative CQI of an SB group to which a corresponding SB belongs with respect to each SB, a table (e.g., Table 27 to Table 30) defining a mapping relation between the differential CQIs and the offset levels illustrated in the method of Option 1) may be used. That is, the method of Option 2) and the method of Option 1) may be combined and used.

An advantage of such an operation is described below. In an environment in which very strong interference (e.g., due to interference from another system, such as a Wi-Fi signal) may be monitored in a specific SB(s) unit, such as the LTE-U band, if a WB CQI is reported as a representative over a full bandwidth as in a conventional SB CSI report operation and an offset level for each SB is reported based on the WB CQI, there is a problem in that a WB CQI may be calculated very conservatively because the locally very strong interference values have a great influence on standardization over the full bandwidth. Accordingly, instead, as in the example of FIG. 22, if a representative CQI for each SB group is reported and reported in the form of a differential CQI within a corresponding SB group, a case where strong interference is abnormally monitored over the specific SB group may be incorporated into a CSI report.

Accordingly, when an eNB receives a CSI report of a form, such as that of FIG. 22, it may incorporate the CSI report into a scheduling decision so that an SB group (or a specific SB) on which a report of an OOR form has been received with respect to a specific SB group is not scheduled in corresponding UE.

For such an operation, a CQI table (e.g., a 4-bit CQI table, such as Table 3 defined in LTE/LTE-A) taken into consideration when a representative CQI Q_K (e.g., Q_K for an SB group #K) is reported for each SB group may be partially modified so that a state, such as the "OOR", is present and applied.

In this case, if a corresponding representative CQI_K for a specific SB group is reported in the "OOR" state, an eNB may exclude the entire corresponding SB group from a scheduling object. Furthermore, in this case, differential CQI report values for other SBs within the corresponding SB group may be limited to become an "OOR" together (e.g., if the differential CQI report value is reported as a different value, it may be considered to be an error case) or all of corresponding differential CQI report values may be omitted (accordingly, a report bit width can be reduced). Accordingly, the corresponding report values may be previously defined as being meaningless, and the corresponding bit width may be defined to be instead used to transfer other information or may be configured in UE.

Option 3) Primary Differential CQI for Each SB Group and Secondary Differential CQI for Each SB Group (i.e., a "Dual Differential CQI") Report In yet another embodiment regarding an SB report, UE reports one WB CQI and reports a differential CQI (i.e., a primary differential CQI) compared with the one WB CQI when reporting each per-SB-group CQI. Furthermore, the UE reports a differential CQI (i.e., a secondary differential CQI) based on such an SB group representative CQI for each SB within a corresponding SB group. That is, this may be considered to be a method for adding a part that reports a differential CQI compared with one WB CQI when the one WB CQI is additionally reported and a representative CQI is reported for each SB group in Option 2).

In this case, for example, a representative CQI for each SB group may correspond to a CQI for a specific SB within a corresponding SB group, the median of CQIs for SBs belonging to a corresponding SB group or an average value of CQIs for SBs belonging to the corresponding SB group.

FIG. 23 is a diagram illustrating a method for reporting a subband CQI according to an embodiment of the present invention.

FIG. 23 illustrates an example in which each SB group includes 3 SBs (i.e., N=3), such as {0, 1, 2}, {3, 4, 5}, . . . , {k, k+1, k+2}, {k+3, k+4, k+5}, . . . .

In the SB CSI report mode, UE reports one WB CQI and a per-SB-group CQI. In this case, the per-SB-group CQI reports an SB group representative differential CQI with the WB CQI and a differential CQI for an SB with a group representative CQI for each SB belonging to a corresponding SB group.

In FIG. 23, UE has reported a CQI for a specific SB (e.g., a CQI for an SB k+1) within a corresponding SB group as an SB group representative differential CQI Q_K with respect to an SB group #K (i.e., a differential CQI for an SB between a WB CQI and a CQI for an SB k+1). Accordingly, the UE may report only a differential CQI for an SB k and a differential CQI for an SB k+2 as a differential CQI for each SB to an eNB.

In contrast, if the median or average value of CQIs for respective SBs is reported as an SB group representative differential CQI Q_K (i.e., a differential CQI for an SB between a WB CQI and the median/average value of CQIs in an SB group #K), UE may report all of a differential CQI between an SB group representative differential CQI Q_K and an SB k, a differential CQI between the SB group representative differential CQI Q_K and an SB k+1, and a differential CQI between the SB group representative differential CQI Q_K and an SB k+2 to an eNB.

An advantage of the "dual differential CQI method" is that additional differential CQIs within each SB group are additionally reported because a process up to the report of SB group representative CQIs is the same or similar to a conventional differential CQI report method. Accordingly, a part that additional differential CQIs within each SB group are reported may be defined in the conventional method as an optional operation or may be configured in UE. For example, an eNB may optionally instruct the UE to perform the additional "dual differential CQI method" report operation through specific higher layer signaling (e.g., RRC signaling or MCA CE signaling) or specific dynamic signaling (e.g., by a DCI).

The characteristics of the operation of the dual differential CQI method, such as FIG. 23, are summarized below. If each SB group representative CQI is to be calculated, delta of a form between a WB CQI and a representative CQI within an SB group is calculated in a differential CQI form.

Furthermore, if another CQI for an SB within each SB group is to be calculated, a delta value of a delta value form between an SB group representative CQI and CQIs for some SBs of the SB group is calculated in a differential CQI form.

In this case, an SB group representative differential CQI and/or a differential CQI for each SB may be defined or configured to report a differential CQI corresponding to a specific offset level value based on a table (e.g., Table 5, Table 7, and Table 11) that defines a mapping relation between differential CQIs and offset levels.

Furthermore, when UE reports an SB group representative differential CQI and/or a differential CQI for each SB, a table (e.g., Table 27 to Table 30) that defines a mapping relation between the differential CQI and the offset levels illustrated in the method of Option 1) may be used. That is, the method of Option 3) and the method of Option 1) may be combined and used.

Option 4) Report a "Primary Differential CQI (i.e., a Differential CQI Between a WB CQI and an SB Group Representative CQI)" in Option 3) in a Bitmap Form (for Determining Whether it is Included in or Excluded from Scheduling (for Indicating Whether Scheduling is Suitable)

When frequency selective interference, such as the LTE-U band, is taken into consideration as a motive in which the method is taken into consideration, for example, if an LTE-U system bandwidth is extended to 20 MHz or more, another system (e.g., Wi-Fi) may have an influence on strong interference only in some RB(s) (or SB(s)). Accordingly, a corresponding RB(s) may be unsuitable for performing PDSCH transmission in the RB(s) (or SB(s)) in which a corresponding resource collision is at least generated. In such a situation, if a WB CQI including up to the corresponding RB(s) is calculated, an excessively conservative value may be reported, which does not help link adaptation. Furthermore, in some cases, the SB CQIs of such RB(s) may be reported in a message of an "OOR" form in the UE CSI report step. Accordingly, there is a need for a method for excluding the corresponding RB(s) from eNB scheduling. In this case, a WB CQI into which only the remaining RB(s) other than the excluded RB(s) have been taken into consideration may be calculated, and such an operation may be preferred. In order to support such an operation, there is proposed a method for slightly modifying the "primary differential CQI" part in Option 3) and reporting it in a "one WB CQI+bitmap (for distinguishing whether it is included in or excluded from scheduling)" form. In this case, a bitmap may have a form in which each SB group is mapped to each bit of the corresponding bitmap in the example of FIG. 23.

If such a bitmap is added, when a corresponding SB group is indicated to be valid, secondary differential CQIs within the corresponding SB group may also be recognized as being a valid report.

In contrast, if a corresponding SB group is indicated to be invalid, all of secondary differential CQIs within the corresponding SB group may also be recognized as being invalid report values or all of reports therefor may be dropped or a corresponding report bit width may be defined or configured to be reused to transfer other information.

In this case, a representative CQI for an actual SB group may not be reported because a primary differential CQI is reported in a bitmap form. In this case, a secondary differential CQI may be reported as a differential CQI between a WB CQI and an SB CQI. In this case, a table (e.g., Table 5, Table 7, and Table 11) that defines a mapping relation between differential CQIs and offset levels defined in the existing LTE/LTE-A may be used. Furthermore, a table (e.g., Table 27 to Table 30) that defines a mapping relation between the differential CQIs and the offset levels illustrated in the method of Option 1) may be used.

Furthermore, only when a corresponding SB group is indicated to be valid by a bitmap, a primary differential CQI for an actual SB group (i.e., a differential CQI between a WB CQI and an SB group representative CQI) may also be reported. In this case, a secondary differential CQI may be reported as a differential CQI between an SB group representative CQI and a CQI for each SB. In this case, a table (e.g., Table 5, Table 7, and Table 11) that defines a mapping relation between differential CQIs and offset levels defined in the existing LTE/LTE-A may be used. Furthermore, a table (e.g., Table 27 to Table 30) that defines a mapping relation between the differential CQIs and the offset levels illustrated in the method of Option 1) may be used.

Furthermore, in a CSI report, a bitmap may be defined or configured to be additionally reported while the method of Option 3) is applied without any change. That is, a differential CQI for each of all of SB groups and a differential CQI for each of all of SBs may be reported.

However, information indicating whether an SB group of a corresponding bitmap is valid (i.e., information for distinguishing whether it is included in or excluded from scheduling) and report information about an actual primary differential CQI in Option 3) may overlap. Accordingly, the transfer of information of a bitmap form may be applied by modifying a specific state in an "OOR" form or adding the corresponding "OOR" state to a corresponding table (e.g., a 4-bit CQI table, such as Table 3 defined in LTE/LTE-A) in a CQI table (e.g., a 4-bit CQI table, such as Table 3 defined in LTE/LTE-A) for calculating a primary differential CQI for each SB group in Option 3).

That is, in this case, the information of a "bitmap" form described in Option 4) may not be separately reported. Furthermore, in the method of Option 3), the state of a specific "OOR" form may be defined in a CQI table (e.g., e.g., a 4-bit CQI table, such as Table 3 defined in LTE/LTE-A) taken into consideration when a primary differential CQI is reported so that it is applied to a CSI report or may be configured in UE. In this case, when the UE calculates a primary differential CQI for each SB group, if the UE sets a corresponding SB group as a value of an "OOR" form and reports the value because very strong interference is monitored in the corresponding SB group, it may be interpreted that the UE performs the transfer of information indicating that the corresponding SB group is "excluded" in the bitmap concept. In contrast, if the UE calculates the corresponding SB group as a different normal CQI level value other than an "OOR" form and reports the value, it may be interpreted that the UE performs the transfer of information indicating that the corresponding SB group is "included" in the bitmap concept.

In such an operation, if a primary differential CQI report for a specific SB group is performed in a form, such as an "OOR" state, UE may calculate one WB CQI by performing a CQI average of SB group(s) not reported as the "OOR" state with respect to all of SB groups. Furthermore, an eNB may recognize that the WB CQI reported by the UE is a WB CQI averaged with respect to only SB group(s) not reported in the "OOR" state as described above.

In the methods proposed in Options 1 to 4, only a CQI has been illustrated as an example, for convenience of description. The proposed methods may be generalized, extended, and applied to a PMI and/or an RI in a similar manner.

For example, a PMI may also be applied in the primary/secondary differential PMI form. More specifically, UE may report one wideband PMI, and may report W1 and/or W2 as a W1 differential value and/or a W2 differential value based on a wideband PMI. In some embodiments, UE may report one wideband PMI, may report W1 as a W1 differential value based on a wideband PMI, and may report W2 as a W2 differential value based on the W1.

Furthermore, an RI may also be configured to be differentially applied for each SB or SB group. In this case, an RI for each WB RI and SB (or SB group) may be reported. If an RI is reported for each SB (or SB group) as described above, a CQI and/or PMI for a corresponding SB (or SB group) may be calculated based on the RI of the corresponding SB (or SB group).

Furthermore, when an RI is reported for each SB (or SB group), it may be reported as an SB (or SB group) differential RI value based on a WB RI. Furthermore, an SB group RI may be reported as an SB group differential RI value based on a WB RI, and an SB RI may be reported as an SB differential RI value based on the SB group RI.

Furthermore, the part described as an "SB group" unit, for convenience of description, has been defined or configured as a concept in which a separate SB group unit has not been defined and which is applied as a representative in a specific SB(s). In other words, an SB group is not previously defined as N SBs fixed, but a plurality of SBs may be configured as one group under the control of an eNB or may be optionally configured by UE flexibly.

In the methods proposed in embodiments of the present invention, in a frequency domain, each SB size may be determined under the control of an eNB or optionally by UE without being previously fixed and defined for each system bandwidth as in Table 6, Table 8 or Table 10.

FIG. 24 is a diagram illustrating a method for configuring a subband according to an embodiment of the present invention.

Referring to FIG. 24(*a*), an eNB sends a subband (SB) size change message to UE at step S2411.

For example, the SB size change message may directly indicate an SB size (e.g., the SB size change message indicates "4" if a SB size is 4 RBs) or may indicate an index indicative of a specific one of candidate SB sizes defined for respective system bandwidths (e.g., the SB size change message may indicate an index 1 in order to indicate 4 RBs if the index 1 for a SB size has been previously defined to be 4 RBs, an index 2 has been previously defined to be 6 RBs, and an index 3 has been previously defined to be 8 RBs).

In this case, the eNB may transfer signaling that changes an SB size to be applied to a method for reporting a specific SB CSI to be reported by the UE through control of specific higher layer signaling (e.g., RRC signaling or MAC CE signaling) or specific dynamic signaling (e.g., a DCI). Accordingly, there is an advantage in that uplink overhead can be controlled because the payload size of uplink feedback transmitted by UE can be adjusted.

In contrast, the UE may directly adjust the SB size selectively.

For example, if the UE determines that the SB size may be adjusted (e.g., the number of RBs per SB is greatly adjusted) because the frequency selectivity of a wireless channel is not great, it may perform a CSI feedback report suitable for a corresponding SB size by directly adjusting the SB size.

As shown in FIG. 24(*b*), UE may transfer an SB size change message for adjusting such an SB size to an eNB when making a corresponding CSI feedback report or may notify the eNB of the SB size through separate signaling at step S2421.

As described above, the SB size change message may directly indicate an SB size or a candidate SB size has been defined for each system bandwidth and the SB size change message may indicate an index indicative of a specific SB size of the candidate SB sizes.

As described above, when the UE selects a change of an SB size, step S2422 may be omitted.

In contrast, the adjustment of the SB size by the UE may be signaling requested from the eNB. In this case, the SB size may be adjusted only when confirmation for the adjustment of the SB size, that is, an SB size change confirm message, is received from the eNB at step S2422.

In the aforementioned embodiment of the present invention, it has been described that an enhanced SB report method for a CC (or cell) having a bandwidth larger than a maximum system bandwidth (e.g., 20 MHz) in a conventional LTE system, in which the bandwidth larger is taken into consideration, may be applied.

As described above, a CC having a larger bandwidth is limited to a unit in a CSI report and/or a downlink signal (e.g., PDSCH transmission), for example. The unit of a cell for a specific radio resource management (RRM) report (e.g., measurement, such as reference signal receive power (RSRP), a received signal strength indicator (RSSI) and/or reference signal received quality (RSRQ)) may be defined to operate with respect to a separate system bandwidth (e.g., limited within 20 MHz) or may be configured in UE.

That is, the CC unit of RRM and the CC unit of a CSI/downlink signal may be differently defined or may be configured in the UE.

This is different from a conventional LTE system operation. For example, in an environment in which an available bandwidth such as the LTE-U band is very large, it may be effective to separate and define or configure the CC unit of RRM and the CC unit of CSI/downlink signal and to enable UE to perform an RRM report and CSI report for different bandwidths.

An example in which the CC unit of a CSI report is larger and the CC unit of an RRM report is smaller has been described above. However, the CC unit of an RRM report may be larger, and corresponding UE may check a CC(s) more suitable for downlink transmission and may receive a CSI report for the CC of a smaller unit with respect to a corresponding CC(s).

For example, in a scenario in which a plurality of transmission points (TPs) uses the same physical cell ID (PCID) in a specific (small cell) cluster/group, UE may report RRM in a CC unit to which a PCID shared by the TPs has been assigned, and may report CSI in a CC unit to which a TPID allocated to each TP has been assigned. Furthermore, the CC unit to which the PCID has been assigned may be set to be larger than the CC unit to which the TPID has been assigned.

Furthermore, a CC unit, that is, an object of a CSI report, and a CC unit upon actual data transmission, such as a PDSCH, may be differently defined or may be configured in UE. If a CSI report has been made with respect to specific multiple CCs, an eNB may schedule one piece of PDSCH transmission in some of corresponding multiple CCs or all of the multiple CCs, or may schedule one piece of PDSCH transmission. In this case, in such a PDSCH, all of associated operations, such as an HARQ operation, may be applied as an operation for one piece of PDSCH transmission.

If a CC unit, that is, an object of an RRM report, a CC unit, that is, an object of a CSI report and/or a CC unit for actual data transmission, such as a PDSCH, are differently set as described above, an eNB may provide UE with configuration information about each of the CC units through specific higher layer signaling (e.g., RRC signaling or MAC CE signaling).

CSI Reference Resource

In most of the methods proposed in the embodiments of the present invention, a CSI report scheme in a frequency domain (e.g., an SB unit) has been described as an example.

A resource in which locally strong interference (e.g., attributable to a Wi-Fi system) is monitored as in the LTE-U band may be locally monitored with respect to a time resource in addition to a specific frequency resource as described above. More specifically, in a heterogeneous system, such as a Wi-Fi signal, the length of a symbol of a corresponding signal may be different from that of a symbol in an LTE system. For example, there is a possibility that strong interference may be monitored in a specific Wi-Fi transmission signal in a specific OFDM symbol unit other than a subframe unit in an LTE system.

In preparation for such a case, when UE makes a CSI report, such a symbol-level interference fluctuation needs to be incorporated into the UE's interference measurement (I-measure).

If a CSI-IM configuration is to be provided to UE for I-measure and a CSI report into which the results of the execution of I-measure for each CSI-IM resource have been incorporated is to be made, new per-CSI-IM-RE based I-measure may be defined to be performed by the UE or may be configured in the UE, instead of the existing per-CSI-IM-based I-measure.

In the case of the per CSI-IM-based I-measure, the results of interference measurement for REs (e.g., 4 REs) forming a CSI-IM resource are averaged, and CSI into which the results have been incorporated is reported to an eNB.

In contrast, in the per CSI-IM-RE-based I-measure according to an embodiment of the present invention, a channel/interference may be measured for each symbol or for each RE, and CSI may be calculated by incorporating the measured channel/interference into the CSI and reported to an eNB.

That is, the results of interference measurement for all of REs belonging to CSI-IM are not averaged, but interference power may be averaged for each symbol. The results of interference measurement in a symbol having great interference may be dropped, and only the results of interference measurement in the remaining symbols may be incorporated when CSI is calculated.

Likewise, the results of interference measurement for all of REs belonging to CSI-IM may not be averaged, but the results of interference measurement for an RE having very great interference may be dropped and interference power in the remaining REs may be averaged (or averaged in a symbol unit) and incorporated when CSI is calculated.

More specifically, if a difference in the measurement power of an interference signal between REs (e.g., 4 REs) forming a CSI-IM resource within one PRB pair is a specific threshold or more, a UE operation for excluding REs measured to have relative great interference power when I-measure is calculated as described above may be defined or may be configured in UE.

For example, a difference between an average value/median of measurement power of an interference signal measured in all of REs and measurement power of an interference signal measured in a specific RE may be calculated and compared with a threshold.

In this case, a comparison of the threshold for each CSI-IM RE has been described. If only a purpose of incorporating a symbol-level interference fluctuation effect is taken into consideration, it may be defined in a form more restricted to an operation for a comparison of the threshold "for each CSI-IM RE present for each symbol" or such an operation may be configured in UE.

For example, a difference between an average value/median of measurement power of an interference signal measured in all of symbols and measurement power of an interference signal measured in a specific symbol may be calculated and compared with a threshold.

In the definition of a CSI reference resource according to the current LTE/LTE-A standard, a subframe instance corresponding to a value "n-n_CQI_ref" is determined to be a reference resource in a time domain based on the value "n_CQI_ref" determined according to a specific condition in the following form. Furthermore, an RI and PMI assumed to obtain a corresponding CQI along with a maximum CQI not exceeding 10% of a block error rate (BLER) assuming that a PDSCH is transmitted in a corresponding reference resource are defined to be subjected to a CSI report.

A CSI reference resource for a serving cell is defined as follows.

In a frequency domain, a CSI reference resource is defined as a group of downlink PRBs corresponding to a band related to a derived CQI.

In a time domain, in the case of UE in which transmission mode 1-9 or transmission mode 10 has been configured along with a single configured CSI process for a serving cell, a CSI reference resource is defined as one downlink subframe "n-n_CQI_ref."

In the case of UE in which transmission mode 10 has been configured along with multiple configured CSI processes for a serving cell, a CSI reference resource for the CSI processes is defined as one downlink subframe "n-n_CQI_ref."

In this case, in a CSI reference resource decision operation to which the per CSI-IM-RE-based I-measure proposed in an embodiment of the present invention and an I-measure execution operation therefor, for example, assuming that a PDSCH is transmitted in a "corresponding decided CSI reference resource instance (e.g., a subframe #n'), a UE operation for assuming that only interference measured in a specific symbol (or a specific interference measurement resource (IMR) RE(s)) appears in an interference characteristic in a corresponding CSI reference resource (e.g., the subframe #n') may be defined or may be configured in UE. In other words, in order to derive a CQI (and a PMI/RI), UE may assume only interference measured in a specific symbol (or a specific interference measurement resource (IMR) RE(s)) of a CSI reference resource.

If a CSI-IM resource is periodically configured (i.e., a ZP CSI RS subframe configuration is periodically configured) and thus a CSI-IM resource is not configured in a CSI reference resource, the results of interference measurement in a corresponding reference subframe may be predicted by extrapolating the results of interference measurement in subframes in which CSI-IM resources prior to the CSI reference resource have been configured.

In this case, a UE operation for "assuming that a PDSCH is transmitted in a "corresponding decided CSI reference resource instance (e.g., a subframe #n'), assuming interference in a corresponding CSI reference resource (e.g., a subframe #n') by extrapolating only interference measured in a specific symbol (or a specific IMR RE(s)) in a subframe in which a CSI-IM resource has been configured may be defined or may be configured in UE.

FIG. 25 is a diagram illustrating a method for sending CSI according to an embodiment of the present invention.

Referring to FIG. 25, UE measures interference for each RE (or symbol) that forms a CSI-IM resource in a CSI reference resource at step S2501.

The UE reflects (i.e., assumes) only the results of interference measurement in the remaining REs (or symbols) other than an RE (or symbol) having measured interference higher than a threshold when CSI is calculated at step S2502.

As described above, assuming that a PDSCH is transmitted in a determined CSI reference resource instance, UE assumes that only interference measured in a specific symbol (or specific IMR RE(s)) appears in an interference characteristic in a corresponding CSI reference resource, and calculates CSI. That is, the UE derives an RI and PMI assumed to obtain a corresponding CQI along with a maximum CQI not exceeding a BLER of 10% on the assumption of only interference and assuming that a PDSCH is transmitted in the corresponding CSI reference resource.

Furthermore, the UE reports the calculated CSI to an eNB at step S2503.

As described above, the UE measures interference in a CSI-IM-RE-based I-measure form and reflects the measured interference when calculating a CQI. Accordingly, there is an advantage in that it can prevent a conservative CQI report from being abnormally performed because an interference signal attributable to an abnormal special situation (e.g., an interference signal attributable to a Wi-Fi signal) is excluded when a CQI is calculated.

In other words, in a frequency domain, if interference is severe in a specific bandwidth, it may be expected that the interference will continue for some time. In this case, in a time domain, there is a difference between an instance at which UE measures interference and an instance at which an eNB schedules the UE. In this case, interference in the time domain is great at the instance at which the UE measures the interference, but relatively small interference may be generated or interference may not be generated at the instance at which the eNB schedules the UE. In this case, if all of the results of interference power of symbols or REs generated in a special situation are averaged and incorporated when CSI is calculated, the UE resultantly reports conservative CSI, thereby being capable of deteriorating efficiency. Accordingly, interference may be neglected in a symbol or RE having very great interference and only interference measured in the remaining symbols or REs may be reported.

General Apparatus to which an Embodiment of the Present Invention May be Applied FIG. 26 illustrates a block diagram of a wireless communication apparatus according to an embodiment of the present invention.

Referring to FIG. 26, the wireless communication system includes an eNB 2610 and a plurality of pieces of UE 2620 located within the area of the eNB 2610.

The eNB 2610 includes a processor 2611, memory 2612, and a radio frequency (RF) unit 2613. The processor 2611 implements the functions, processes and/or methods proposed in FIGS. 1 to 25. The layers of a wireless interface protocol may be implemented by the processor 2611. The memory 2612 is connected to the processor 2611 and stores various pieces of information for driving the processor 2611. The RF unit 2613 is connected to the processor 2611 and transmits and/or receives a radio signal.

The UE 2620 includes a processor 2621, memory 2622, and an RF unit 2623. The processor 2621 implements the functions, processes and/or methods proposed in FIGS. 1 to 25. The layers of a wireless interface protocol may be implemented by the processor 2621. The memory 2622 is connected to the processor 2621 and stores various pieces of information for driving the processor 2621. The RF unit 2623 is connected to the processor 2621 and transmits and/or receives a radio signal.

The memory 2612, 2622 may be inside or outside the processor 2611, 2621 and connected to the processor 2611, 2621 by various well-known means. Furthermore, the eNB 2610 and/or the UE 2620 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A scheme for transmitting and receiving channel state information in a wireless communication system according to an embodiment of the present invention has been chiefly illustrated as being applied to a 3GPP LTE/LTE-A system, but may be applied to various wireless communication systems in addition to the 3GPP LTE/LTE-A system.

The invention claimed is:

1. A method for transmitting, by a user equipment (UE), channel state information (CSI) in a wireless communication system, the method comprising:
determining CSI for a serving cell of an unlicensed band; and
transmitting the CSI at a periodic CSI reporting instance within a reserved resource period (RRP) which is a time period occupied to transmit and receive data in the serving cell,
wherein another CSI prior to an initial rank indication (RI) reporting instance within the RRP is dropped or transmitted through an out of range (OOR) message.

2. The method of claim 1, wherein if a latest RI reported prior to the RRP is reported within a specific time window, the other CSI prior to the initial RI reporting instance within the RRP is determined based on the latest RI.

3. The method of claim 1, wherein:
the CSI is transmitted on a physical uplink shared channel (PUSCH), and
the periodic CSI reporting instance is determined through a higher layer parameter.

4. The method of claim 1, wherein:
the CSI comprises a wideband CSI value and a subband differential CSI value,
the subband differential CSI value indicates an offset level between the wideband CSI value and a subband CSI value, and
the offset level includes an out of range (OOR) state indicating that scheduling is inappropriate in the subband.

5. The method of claim 1, wherein:
the CSI includes a representative CSI value of a subband group and a subband differential CSI value within each subband group,
the representative CSI value of the subband group is determined as an average value or median of CSI values of subbands belonging to the subband group or a CSI value of any one of subbands belonging to the subband group, and
the subband differential CSI value indicates an offset level between the representative CSI value of the subband group and a subband CSI value.

6. The method of claim 5, wherein the offset level comprises an out of range (OOR) state indicating that scheduling is inappropriate in the subband group.

7. The method of claim 1, wherein:
the CSI includes a wideband CSI value, a differential CSI value of a subband group, and a subband differential CSI value within each subband group,
the differential CSI value of the subband group indicates a first offset level between the wideband CSI value and a subband group CSI value,
the subband differential CSI value indicates a second offset level between the representative CSI value of the subband group and a subband CSI value, and
the representative CSI value of the subband group is determined as an average value or median of CSI values of subbands belonging to the subband group or a CSI value of any one of subbands belonging to the subband group.

8. The method of claim 7, wherein the first offset level comprises an out of range (OOR) state indicating that scheduling is inappropriate in the subband group.

9. The method of claim 7, wherein:
the differential CSI value of the subband group comprises a bitmap in which each subband group is mapped to each bit, and
whether scheduling in a corresponding subband group is appropriate is indicated based on a bit value of the bitmap.

10. The method of claim 1, wherein in a frequency domain, each subband size is determined by control of an evolved NodeB (eNB) or selectively determined by the UE.

11. The method of claim 1, wherein a unit of a component carrier which is an object of the CSI to be reported, a unit of a component carrier which is an object of radio resource management (RRM) measurement, and a unit of a component carrier which is a physical downlink shared channel (PDSCH) object are independently determined.

12. The method of claim 1, wherein when determining the CSI by the UE, the UE assumes only interference measured in a specific resource element/symbol of resource elements/symbols forming a CSI-interference measurement (IM) resource.

13. The method of claim 1, wherein the CSI includes one or more of a channel quality indicator (CQI), a precoding matrix indicator (PMI), a rank indication (RI), or a precoding type indicator (PTI).

14. A user equipment (UE) transmitting channel state information (CSI) in a wireless communication system, the UE comprising:
a radio frequency (RF) unit transmitting and receiving a radio signal; and
a processor controlling the UE,
wherein the processor:
determines CSI for a serving cell of an unlicensed band; and
transmits the CSI at a periodic CSI reporting instance within a reserved resource period (RRP) which is a time period occupied to transmit and receive data in the serving cell, wherein another CSI prior to an initial rank indication (RI) reporting instance within the RRP is dropped or transmitted through an out of range (OOR) message.

\* \* \* \* \*